United States Patent
Shibayama et al.

(10) Patent No.: US 8,140,802 B2
(45) Date of Patent: Mar. 20, 2012

(54) STORAGE SYSTEM AND STORAGE SYSTEM DATA MIGRATION METHOD

(75) Inventors: Tsukasa Shibayama, Kawasaki (JP); Wataru Okada, Yokohama (JP); Yukinori Sakashita, Sagamihara (JP); Yuri Hiraiwa, Sagamihara (JP); Masahide Sato, Noda (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/167,867

(22) Filed: Jun. 24, 2011

(65) Prior Publication Data

US 2011/0252213 A1 Oct. 13, 2011

Related U.S. Application Data

(63) Continuation of application No. 12/873,432, filed on Sep. 1, 2010, now Pat. No. 7,996,640, which is a continuation of application No. 12/269,164, filed on Nov. 12, 2008, now Pat. No. 7,805,585, which is a continuation of application No. 11/445,202, filed on Jun. 2, 2006, now Pat. No. 7,469,325.

(30) Foreign Application Priority Data

Apr. 13, 2006 (JP) .................. 2006-110494

(51) Int. Cl.
*G06F 12/16* (2006.01)

(52) U.S. Cl. ......... 711/165; 711/161; 711/162; 714/6.1; 714/6.23

(58) Field of Classification Search .................. 711/161, 711/162, 165; 714/6.1, 6.23
See application file for complete search history.

(56) References Cited

U.S. PATENT DOCUMENTS

| 5,159,597 A | | 10/1992 | Monahan et al. | |
|---|---|---|---|---|
| 5,640,506 A | * | 6/1997 | Duffy | 714/6.12 |
| 6,108,748 A | | 8/2000 | Ofek et al. | |
| 6,125,394 A | | 9/2000 | Rabinovich | 709/226 |
| 2002/0099908 A1 | | 7/2002 | Yamamoto et al. | |
| 2003/0046497 A1 | * | 3/2003 | Dandrea | 711/154 |
| 2003/0191916 A1 | | 10/2003 | McBrearty et al. | 711/162 |
| 2003/0221063 A1 | | 11/2003 | Eguchi et al. | 711/114 |
| 2004/0039875 A1 | | 2/2004 | Kuwata | 711/114 |
| 2005/0154849 A1 | | 7/2005 | Watanabe | |
| 2006/0143238 A1 | | 6/2006 | Tamatusu | |

FOREIGN PATENT DOCUMENTS

| JP | 10-133971 | 5/1998 |
|---|---|---|
| JP | 63279329 | 11/1998 |
| JP | 2000-293317 | 10/2000 |
| JP | 2001-147861 | 5/2001 |
| JP | 2003-140836 | 5/2003 |
| JP | 2003-345522 | 12/2003 |

* cited by examiner

*Primary Examiner* — Jae Yu
(74) *Attorney, Agent, or Firm* — Brundidge & Stanger, P.C.

(57) ABSTRACT

This storage system modifies the migration plan in accordance with the state of the migration destination when a plurality of volumes are migrated all at once. Migration-source volumes are migrated collectively to volumes inside the migration-destination storage apparatus. The user can make settings related to migration-source volumes and migration-destination volumes in a migration plan, and can establish a mid-process control plan for modifying the migration plan in the middle of processing. If a failure occurs in the migration-destination storage apparatus subsequent to the commencement of data migration processing, a processing method controller either cancels or temporarily halts the data migration processing, or changes the migration destination, on the basis of the mid-process control plan. When changing the migration destination, a previously selected alternate storage apparatus is selected as the new migration-destination storage apparatus. When a failure occurs in the alternate storage apparatus, yet another alternate storage apparatus is selected.

9 Claims, 28 Drawing Sheets

FIG. 7

GROUP MANAGEMENT TABLE 225

| RESOURCE GROUP NUMBER 2251 | PARENT RESOURCE GROUP NUMBER 2252 | APPARATUS ID OF MIGRATION-SOURCE STORAGE APPARATUS AND VOLUME ID 2253 |
|---|---|---|
| 1 | - | SS1.01, SS1.02, SS1.03 |
| 2 | - | SS2.07, SS2.08, SS2.09 |
| 3 | - | SS3.13, SS3.14, SS4.13, SS4.14 |
| 4 | 3 | SS3.13, SS3.14 |
| 5 | 3 | SS4.14, SS4.14 |
| ... | ... | ... |

FIG. 8

MIGRATION MANAGEMENT TABLE (226)

| RESOURCE GROUP NUMBER (2261) | MIGRATION SOURCE (2262) | | MIGRATION DESTINATION (2263) | | MIGRATION STATUS FLAG (2264) | CONNECTED HOST (2265) | ALTERNATE MIGRATION DESTINATION (2266) | |
|---|---|---|---|---|---|---|---|---|
| | APPARATUS ID | VOLUME ID | APPARATUS ID | VOLUME ID | | | APPARATUS ID | VOLUME ID |
| 1 | SS1 | 01 | SS3 | 02 | 0 | 10:00:CE:... | SS4 | 01 |
| 2 | SS1 | 02 | SS3 | 03 | 1 | 10:00:CE:... | SS4 | 02 |
| ... | ... | ... | ... | ... | ... | ... | ... | ... |

FIG. 9

MIGRATION PLAN TABLE

| RESOURCE GROUP NUMBER (2271) | EVENT TYPE (2272) | DEGREE OF PROGRESS (%) (2273) | | MID-PROCESS CONTROL PROCESS (2274) | RESTART TIME (2275) |
|---|---|---|---|---|---|
| | | MORE THAN | LESS THAN | | |
| 1 | PARTIAL FAILURE OF CONTROLLER | 0 | 100 | CHANGE MIGRATION DESTINATION | - |
| 1 | PARTIAL FAILURE OF PATH | 0 | 100 | CHANGE MIGRATION DESTINATION | - |
| 1 | PARTIAL FAILURE OF POWER SOURCE | 0 | 100 | CHANGE MIGRATION DESTINATION | - |
| 1 | PARTIAL FAILURE OF CACHE MEMORY | 0 | 100 | CHANGE MIGRATION DESTINATION | - |
| 1 | LOAD INCREASE OF MORE THAN SET VALUE | 0 | 50 | CANCEL | - |
| 1 | LOAD INCREASE OF MORE THAN SET VALUE | 51 | 100 | TEMPORARY HALT | AFTER ONE HOUR |
| 1 | FAILURE OF MIGRATION-DESTINATION VOLUME | 0 | 30 | CANCEL | - |
| 1 | FAILURE OF MIGRATION-DESTINATION VOLUME | 31 | 100 | CHANGE MIGRATION DESTINATION | - |
| 2 | PARTIAL FAILURE OF CONTROLLER | 0 | 100 | CHANGE MIGRATION DESTINATION | - |
| ... | ... | ... | ... | ... | ... |

FIG. 10

VOLUME ATTRIBUTE TABLE 228

| APPARATUS ID 2281 | VOLUME ID 2282 | DISK TYPE 2283 | RAID LEVEL 2284 | CAPACITY 2285 |
|---|---|---|---|---|
| SS3 | 03 | FC | RAID1+0(2D+2P) | 100GB |
| SS3 | 04 | FC | RAID1+0(2D+2P) | 150GB |
| SS2 | 03 | SATA | RAID5(3D+1P) | 100GB |
| SS2 | 04 | SATA | RAID5(3D+1P) | 150GB |
| ... | ... | ... | ... | ... |

FIG. 11

UTILIZATION HISTORY TABLE — 229 / 229A

UTILIZATION HISTORY TABLE (CONTROLLER LOAD)

| MEASUREMENT DATE/TIME (2291) | APPARATUS ID (2292) | CONTROLLER LOAD (2293) |
| --- | --- | --- |
| 200512271200 | SS2 | 80% |
| 200512271300 | SS2 | 40% |
| 200512271400 | SS2 | 20% |
| ... | ... | ... |

UTILIZATION HISTORY TABLE (CACHE MEMORY USAGE RATE) — 229B

| MEASUREMENT DATE/TIME (2291) | APPARATUS ID (2292) | CACHE MEMORY USAGE RATE (2293) |
| --- | --- | --- |
| ... | ... | ... |

FIG. 12

| ALTERNATE STORAGE APPARATUS CANDIDATE TABLE ||| 230 |
|---|---|---|
| RESOURCE GROUP NUMBER | APPARATUS ID AND VOLUME ID | ALTERNATE VOLUME CANDIDATE |
| 1 | SS1.01 | SS5.01, SS6.01 |
| 1 | SS1.02 | SS5.02, SS6.02 |
| 2 | SS2.01 | SS7.01, SS8.01, SS9.01 |

(column headers: 2301, 2302, 2303)

FIG. 25

VOLUME ATTRIBUTE TABLE 228A

| APPARATUS ID | VOLUME ID | DISK TYPE | RAID LEVEL | CAPACITY | PAIR PARTNER |
|---|---|---|---|---|---|
| SS3 | 03 | FC | RAID1+0(2D+2P) | 100GB | SS4.03 |
| SS3 | 04 | FC | RAID1+0(2D+2P) | 150GB | SS4.04 |
| SS4 | 03 | FC | RAID1(2D+2P) | 100GB | SS3.03 |
| SS4 | 04 | FC | RAID1(2D+2P) | 150GB | SS4.03 |
| SS4 | 05 | FC | RAID1(2D+2P) | 100GB | - |
| SS4 | 06 | FC | RAID1(2D+2P) | 150GB | - |
| SS7 | 03 | SATA | RAID5(3D+1P) | 100GB | - |
| SS7 | 04 | SATA | RAID5(3D+1P) | 150GB | - |
| ... | ... | ... | ... | ... | ... |

2281  2282  2283  2284  2285  2286

STORAGE SYSTEM AND STORAGE SYSTEM DATA MIGRATION METHOD

CROSS-REFERENCE TO RELATED APPLICATIONS

This application relates to and claims priority from Japanese Patent Application No. 2006-110494 filed on Apr. 13, 2006, and is a continuation of U.S. application Ser. No. 12/873,432, filed Sep. 1, 2010 now U.S. Pat. No. 7,996,640; which is a continuation of U.S. application Ser. No. 12/269,164, filed Nov. 12, 2008, now U.S. Pat. No. 7,805,585; which is a continuation of U.S. application Ser. No. 11/445,202, filed Jun. 2, 2006, now U.S. Pat. No. 7,469,325, the entire disclosures of which are incorporated herein by reference.

BACKGROUND

The present invention relates to a storage system and a storage system data migration method.

In recent years, the disk capacity of a storage apparatus, which provides a data storage region, has been increased in line with the larger amounts of data being processed by a host computer (hereinafter, "host"). A storage apparatus creates a pool region from a plurality of physical disk storage regions, extracts from this pool region a storage region of a capacity required by a host to create a logical volume, and provides this logical volume to the host. The host writes and reads data to and from this logical volume.

Although there are differences according to the type of data, generally speaking, the utility value of data decreases with the passage of time, and little used data is stored in a logical volume. If an expensive disk is used to create a logical volume utilized by a host, data of little utility value will be wastefully stored in the storage region of an expensive disk, and the cost-effectiveness of the disk will be reduced.

Further, for example, according to the law, there are situations in which data, such as electronic mail and medical data, must be maintained for a fixed period of time or longer, even, for example, when it is low use data. When an expensive disk is used as the storage destination for data to be stored over a long period of time, as described hereinabove, the cost-effectiveness of the disk decreases, and the operational cost of the storage apparatus rises. With this sort of problem in mind, technology for migrating data from an expensive disk to a low-cost disk has been proposed (Japanese Laid-open Patent No. 2000-293317, U.S. Pat. No. 6,108,748, Japanese Laid-open Patent No. 2003-140836, and Japanese Laid-open Patent No. 2003-345522).

In the above-mentioned prior art, data can be moved by copying data from one disk to another disk. A user, for example, selects a migration-source storage apparatus and a migration-destination storage apparatus, and devises a data migration plan for the purpose of improving the cost-effectiveness of a disk, and enhancing the response performance of high-use data. Here, for example, when migration is performed simultaneously to a plurality of associated volumes, as with volumes that form a copy pair, data migration must be completed by maintaining this association as-is.

However, since the state of a storage apparatus changes in various ways, there is no guarantee of achieving results that correspond to the initial data migration plan. For example, in the case of a storage system that is required to operate non-stop 24-hours-a-day, 365-days-a-year, data will be migrated as the storage apparatus is operating. Therefore, data migration is carried out under an environment in which the states of the components of a storage apparatus (controller, cache memory, and so forth) change in various ways.

If a failure of some sort should occur in the migration-destination storage apparatus during data migration, for example, even if data migration processing is capable of continuing at the time the failure occurs, there will be occasions when the results anticipated by the initial data migration plan will not be achievable thereafter due to the secondary effects of the failure. For example, despite the fact that data migration was executed for the purpose of improving response performance, if the load on the data migration-destination storage apparatus rises, there are times when the anticipated response performance cannot be achieved following completion of the data migration. In this case, a user must go to the added trouble of devising a new data migration plan for realizing the initially anticipated response performance, and re-migrating the data.

Further, it is also possible that data migration processing will fail part way through due to the failure that occurred in the migration-destination storage apparatus. In this case as well, just as described hereinabove, a user must create a new data migration plan and carry out data migration processing.

In addition, the migration of data respectively to a plurality of migration-destination storage apparatuses can also be considered, but if data migration to any one of these migration-destination storage apparatuses fails, a user must execute data migration by creating a data migration plan all over again. When carrying out a data migration, a user devises a data migration plan, sets up the storage apparatuses according to this plan, and waits for data copying to be completed. Therefore, carrying out repeated data migrations to the same migration-targeted volume reduces customer satisfaction. Thus, in the prior art, data migration that takes into consideration the fluctuating state of a storage apparatus is not examined, and as such, is not very user-friendly.

SUMMARY

With the foregoing in mind, an object of the present invention is to provide a storage system and storage system data migration method that can enhance the ease-of-use of a user when migrating data to a plurality of volumes as a group. Another object of the present invention is to provide a storage system and storage system data migration method that can automatically modify an initial migration plan in accordance with the state of a migration destination when migrating data to a plurality of volumes as a group. Yet other objects of the present invention should become clear from the disclosure of the embodiments, which will be explained hereinbelow.

A storage system, which accords with a first aspect of the present invention, and solves for the above-mentioned problems, is a storage system, which comprises a plurality of storage apparatuses each having at least one logical volume, the storage system comprising a data migration processor for selecting at least one of the respective storage apparatuses as a migration-source storage apparatus, selecting at least one of the respective storage apparatuses as a migration-destination storage apparatus, and executing data migration processing for migrating a plurality of logical volumes as a group from the migration-source storage apparatus to the migration-destination storage apparatus; a monitoring unit for monitoring the state of at least one migration-destination storage apparatus; and a processing method controller for controlling the processing method of data migration processing based on the state of at least one migration-destination storage apparatus monitored by the monitoring unit.

In an embodiment of the present invention, a processing method controller comprises a plurality of respectively different processing methods, and controls the processing method of data migration processing by selecting any one processing method from among the plurality of processing methods.

In an embodiment of the present invention, a processing method controller comprises a plurality of respectively different processing methods, and, when the state of a migration-destination storage apparatus coincides with a pre-set execution condition, controls the processing method of data migration processing midway through the data migration processing by selecting, from among the plurality of processing methods, a processing method that is made correspondent to the execution condition beforehand.

In an embodiment of the present invention, a processing method controller comprises a plurality of respectively different processing methods, and an execution condition, which is defined by making the state of a migration-destination storage apparatus and the progress of data migration processing correspondent to a processing method selected from among the plurality of processing methods, is set beforehand, and the processing method controller controls the processing method of data migration processing midway through the data migration processing by selecting the processing method defined by the execution condition when the state of a migration-destination storage apparatus and the progress of the data migration processing coincide with the execution condition.

In an embodiment of the present invention, the plurality of processing methods comprise at least a first processing method for canceling data migration processing; a second processing method for interrupting data migration processing; and a third processing method for changing a migration-destination storage apparatus to an alternate storage apparatus selected from among the respective storage apparatuses, and allowing data migration processing by the data migration processor to continue.

An embodiment of the present invention is constituted such that the monitoring unit monitors the states of storage apparatuses other than the migration-destination storage apparatus, and the processing method controller selects an alternate storage apparatus based on the states of the other storage apparatuses when the third processing method is made correspondent to the execution condition.

In an embodiment of the present invention, the alternate storage apparatus is defined beforehand in the execution condition, the monitoring unit monitors the respective states of the migration-destination storage apparatus and the alternate storage apparatus, and the processing method controller determines whether or not it is possible to switch from the migration-destination storage apparatus to the alternate storage apparatus based on the state of the alternate storage apparatus when the state of the migration-destination storage apparatus coincides with the execution condition, and when it is determined that switching is possible, changes the migration-destination storage apparatus to the alternate storage apparatus.

In an embodiment of the present invention, the plurality of logical volumes targeted for data migration processing by the data migration processor have an association with one another, and when the processing method controller determines that it is not possible to switch from the migration-destination storage apparatus to the alternate storage apparatus, it generates, inside the migration-source storage apparatus, a copy volume of either all or a portion of a logical volume of the logical volumes having the association, and establishes the association in the copy volume.

In an embodiment of the present invention, the alternate storage apparatus is defined beforehand in the execution condition, the monitoring unit respectively monitors the states of the migration-destination storage apparatus, the alternative storage apparatus, and another storage apparatus, and the processing method controller, (1) when the state of a migration-destination storage apparatus coincides with an execution condition, determines whether or not it is possible to switch to the alternate storage apparatus based on the state of the alternate storage apparatus; (2) when it has been determined that switching to the alternate storage apparatus is possible, switches from the migration-destination storage apparatus to the alternate storage apparatus; and (3) when it has been determined that switching to the alternate storage apparatus is not possible, selects a new alternate storage apparatus based on the state of another storage apparatus being monitored by the monitoring unit, and switches the migration-destination storage apparatus to the newly selected alternate storage apparatus.

In an embodiment of the present invention, the processing method controller, prior to switching the migration-destination storage apparatus to either the alternate storage apparatus or the new alternate storage apparatus, requests approval regarding the propriety of switching, and when approval is forthcoming, switches from the migration-destination storage apparatus to either the alternate storage apparatus or the new alternate storage apparatus.

In an embodiment of the present invention, the monitoring unit respectively monitors the states of the migration-source storage apparatus and the migration-destination storage apparatus, and, when the third processing method is made correspondent to the execution condition, the processing method controller treats either the migration-source storage apparatus or the migration-destination storage apparatus, whichever has the least load, as the migration source, and re-migrates data, which has already been migrated to the migration-destination storage apparatus, to the alternate storage apparatus.

In an embodiment of the present invention, the monitoring unit is constituted so as to monitor, as the state of at least the migration-destination storage apparatus, the load state, the cache memory usage state, and the fault status of the migration-destination storage apparatus.

In an embodiment of the present invention, an execution condition can be set for each of a plurality of states of the migration-destination storage apparatus.

A storage system according to another aspect of the present invention is a storage system, which comprises a plurality of storage apparatuses each having at least one logical volume, and a management apparatus for managing these respective storage apparatuses, the storage system comprising a data migration processor for selecting at least one of the respective storage apparatuses as a migration-source storage apparatus, selecting at least one of the respective storage apparatuses as a migration-destination storage apparatus, and executing data migration processing for migrating a plurality of logical volumes as a group from the migration-source storage apparatus to the migration-destination storage apparatus; a monitoring unit for monitoring the state of at least one migration-destination storage apparatus; and a processing method controller for controlling the processing method of data migration processing based on the state of at least one migration-destination storage apparatus monitored by the monitoring unit, and the monitoring unit and processing method controller are respectively disposed in the management apparatus, and the data migration processor is disposed in at least a migration-source storage apparatus.

A data migration method of a storage system according to yet another aspect of the present invention is a data migration method for migrating data from a migration-source storage apparatus to a migration-destination storage apparatus in a storage system comprising a plurality of storage apparatuses, the data migration method respectively executing the steps of detecting the state of the migration-destination storage apparatus; commencing data migration processing for migrating a volume group comprising a plurality of logical volumes having an association with one another from the migration-source storage apparatus to the migration-destination storage apparatus; determining whether or not the state of a migration-destination storage apparatus satisfies a preset execution condition; and changing the processing method of data migration processing midway through the data migration processing, when it has been determined that the state of a migration-destination storage apparatus satisfies the execution condition.

There will be cases when either all or a portion of the functions, means and steps of the present invention, for example, can be constituted as a computer program executed by a microcomputer. Then, this computer program, for example, can be affixed on a storage medium, such as a hard disk, optical disk, or semiconductor memory, and distributed. Or, the computer program can also be delivered via the Internet or other such communication network.

BRIEF DESCRIPTION OF THE DRAWINGS

FIG. 7 is a schematic diagram showing the constitution of a group management table;

FIG. 8 is a schematic diagram showing the constitution of a migration management table;

FIG. 9 is a schematic diagram showing the constitution of a migration plan table;

FIG. 10 is a schematic diagram showing the constitution of a volume attribute table;

FIG. 11 is a schematic diagram showing the constitution of a utilization history table;

FIG. 12 is a schematic diagram showing an alternate storage apparatus candidate table;

FIG. 25 is a schematic diagram showing the constitution of a volume attribute management table;

DESCRIPTION OF THE PREFERRED EMBODIMENTS

Figure 1:
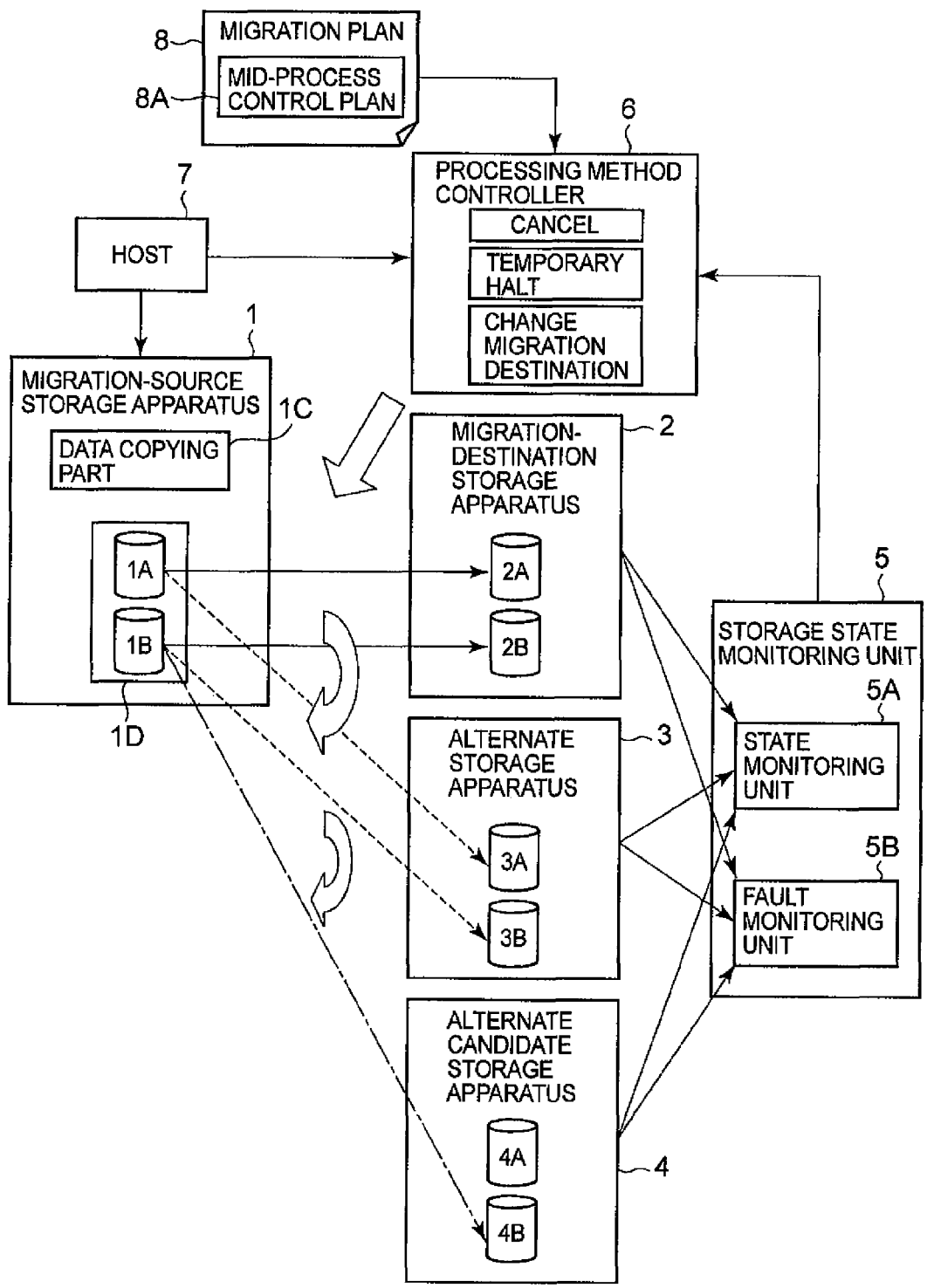
FIG. 1 is a schematic diagram showing the concept of an embodiment of the present invention.

An embodiment of the present invention will be explained hereinbelow on the basis of the figures. FIG. 1 is an overall concept diagram of this embodiment. Details will be explained further below, but as shown in FIG. 1, the storage system of this embodiment, for example, can be constituted comprising a plurality of storage apparatuses 1, 2, 3, 4, a storage state monitoring unit 5, a processing method controller 6, and a host 7.

The respective storage apparatuses 1, 2, 3, 4, for example, each comprise a hard disk drive or other such storage device, and have at least one logical volume, which is created using the storage region of the storage device. That is, storage apparatus 1 has logical volumes 1A, 1B, storage apparatus 2 has logical volumes 2A, 2B, storage apparatus 3 has logical volumes 3A, 3B, and storage apparatus 4 has logical volumes 4A, 4B, respectively. Furthermore, in the explanation that follows, there will be times when a logical volume is abbreviated and called a "volume".

Further, the storage apparatus 1 (migration-source storage apparatus) selected by a user as the migration source of data migration processing comprises a data copying part 10. The data copying part 10 corresponds to a data migration processor.

The volumes 1A, 1B of the migration-source storage apparatus 1, for example, are mutually associated, like volumes that form a copy pair. Furthermore, the association between the volumes is not limited to a copy pair. The constitution is such that the volumes 1A, 1B, which have these associations, are grouped together as a resource group 1D, and data migration is carried out simultaneously as a group. In this example, it is supposed that the migration-targeted volumes 1A, 1B are migrated collectively to a migration-destination storage apparatus 2.

The storage state monitoring unit 5 corresponds to the "monitoring unit". The storage state monitoring unit 5 (hereinafter, the "monitoring unit 5") respectively monitors the states of all the other storage apparatuses 3, 4 in addition to the migration-destination storage apparatus 2. Further, the monitoring unit 5 can also monitor the state of the migration-source storage apparatus 1.

For example, the presence or absence of a failure in the respective storage apparatuses 2, 3, 4, the state of the communication channel, the load state of the controller, the load state of the parity group, and the state of usage of the cache memory can be cited as the monitoring targets of the monitoring unit 5. That is, the monitoring unit 5, for example, can comprise a performance monitoring unit 5A and a fault monitoring unit 5B. The performance monitoring unit 5A monitors information related to the performances of the respective storage apparatuses 2, 3, 4 (or the storage apparatuses 1 through 4). The fault monitoring unit 5B monitors information related to a failure in the respective storage apparatuses 2, 3, 4 (or the storage apparatuses 1 through 4).

The processing method controller 6 is for controlling the method of data migration processing during data migration processing. The processing method controller 6, for example, is provided beforehand with three types of processing methods: "cancel", "interrupt" and "change migration destination". "Cancel" signifies the canceling of data migration processing that has been started. "Interrupt" signifies the temporary halting of data migration processing that has been started. In this case, the data migration processing can be restarted after the passage of a predetermined period of time. "Change migration destination" signifies changing the data migration destination from the initially scheduled migration-destination storage apparatus to another storage apparatus.

In this embodiment, as will be described hereinbelow, the constitution is such that, when a failure of some sort occurs in the initially scheduled migration-destination storage apparatus 2, the data migration destination is changed to either an alternate storage apparatus 3 specified beforehand by the user, or another, newly selected alternate storage apparatus 4.

Here, the monitoring unit 5 and the processing method controller 6 can be disposed inside the storage apparatus 1 host 7. Or, the monitoring unit 5 and the processing method controller 6 can also be disposed inside a computer for management use (for example, the management server 200 in FIG. 2). Or, a constitution, in which the monitoring unit 5 is provided by being distributed among the respective storage apparatuses 1, 2, 3, 4, and the processing method controller 6 is disposed in the host 7 and management computer, is also acceptable.

The host 7, for example, is constituted as either a server computer or a mainframe computer, and makes use of the volumes 1A, 1B of the migration-source storage apparatus 1.

A migration plan 8 is prepared by the user, and the contents of a plan related to data migration processing are stored. For example, the storage apparatus to be used as the migration-source storage apparatus, the storage apparatus to be used as the migration-destination storage apparatus, the volume to be moved, and when data migration is to commence are set in the migration plan 8.

It should be noted here that the migration plan 8 of this embodiment comprises a mid-process control plan 8A. A condition for changing the method of commenced data migration processing midway through the processing, and a changing method are stored in the mid-process control plan 8A. For example, settings can be made beforehand so that, when a failure occurs in the migration-destination storage apparatus 2 midway through the data migration processing, the user can either "cancel" or "interrupt" this data migration processing, or allow the process to proceed via a "change migration destination".

Further, taking the progress of the data migration processing into consideration, the user can also specify beforehand that the processing method of the data migration processing be changed. The progress of the data migration processing, for example, signifies the rate at which the data migration processing progresses. In this embodiment, consideration can be given to the progress of the data migration processing in order to change the processing method of the data migration processing during data migration processing.

For example, when a minor failure occurs in the migration-destination storage apparatus 2, the user can allow the data migration processing to proceed as-is when the data migration processing has reached a level of completion that is greater than a predetermined value, and can either "cancel" or "interrupt" the data migration processing when the data migration processing has only progressed up to a point that is less than a predetermined value. Thus, for the same observed event in the migration-destination storage apparatus 2, the user can freely set how the data migration processing method will be changed in accordance with the progress of the data migration processing at that time.

As explained hereinabove, when the user sets a "change migration destination", an alternate storage apparatus 3 is specified beforehand in the mid-process control plan 8A in order to switch over from the migration-destination storage apparatus 2. Accordingly, the processing method controller 6 changes the migration destination by taking into account the state of the alternate storage apparatus 3 as well as the state of the migration-destination storage apparatus 2.

In other words, when a failure occurs in the migration-destination storage apparatus 2, or the load on the migration-destination storage apparatus 2 increases, the processing method controller 6 can take into account the state of the alternate storage apparatus 3, and make a determination as to whether or not it is possible to switch the migration destination to the alternate storage apparatus 3. When it determines that switching is possible, the processing method controller 6 switches the data migration destination of the data migration processing from the initial migration-destination storage apparatus 2 to the alternate storage apparatus 3.

In addition, the processing method controller 6 can also determine the state of another storage apparatus 4 beside the alternate storage apparatus 3. Thus, for example, even when it is not possible to switch from the migration-destination storage apparatus 2 to the alternate storage apparatus 3 due to a failure having occurred in the alternate storage apparatus 3, it can propose that the user set the other storage apparatus 4 as a new alternate storage apparatus. When the user approves this proposal, the processing method controller 6 changes the migration-destination storage apparatus of the data migration processing to the new alternate storage apparatus 4.

Thus, in this embodiment, the states (performance, fault) of the storage apparatuses 2, 3, 4 (or, storage apparatuses 1 through 4) under management are respectively checked while the data migration processing is being carried out. Then, when the user sets a "change migration destination" in the mid-process control plan 8A beforehand, the processing method controller 6 can propose an available storage apparatus as an alternate storage apparatus to the user based on the results of the check (monitoring results) during the data migration processing.

In this embodiment, the constitution is such that the processing method of data migration processing can be changed midway through the data migration processing based on the state of the migration-destination storage apparatus 2. Therefore, for example, when a failure occurs in the migration-destination storage apparatus 2, or the load on the migration-destination storage apparatus 2 increases during the data migration processing, it is possible to cancel a useless data migration processing, to put the data migration processing on standby until a failure or overload on the migration-destination storage apparatus 2 has been eliminated, or to carry out the data migration processing by switching to an alternate storage apparatus 3. This makes it possible to reduce the time and trouble associated with redoing the data migration processing, and to enhance the usability of the user. This embodiment will be explained in more detail hereinbelow.

First Embodiment

Figure 2:
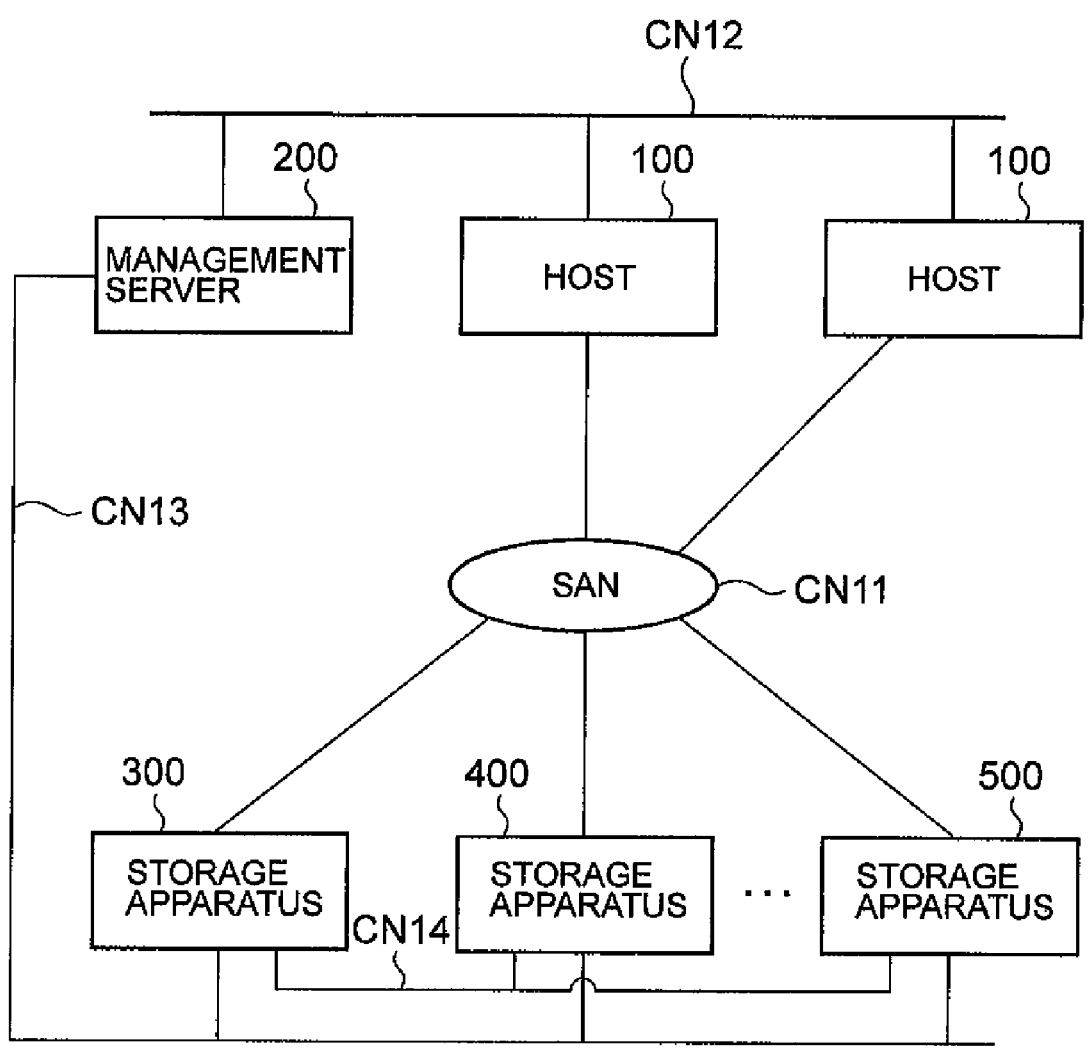
FIG. 2 is a schematic diagram showing the entire constitution of a storage system.

FIG. 2 is a schematic diagram showing the entire constitution of a storage system. This storage system, for example, is constituted comprising one or a plurality of hosts 100, at least one management server 200, and a plurality of storage apparatuses 300, 400, 500.

A host 100, for example, is constituted as a server computer or a mainframe computer, and reads and writes data using volumes provided by the storage apparatuses 300, 400, 500.

The management server 200 is a computer, which corresponds to the "management apparatus", and collects information from the respective storage apparatuses 300, 400, 500, and hosts 100, and manages the migration of data inside the storage system. This will be explained in detail hereinbelow.

The network composition will be explained. The hosts 100, for example, are respectively connected to the storage apparatuses 300, 400, 500 via a network CN11 used for data input and output, such as a LAN (Local Area Network) or a SAN (Storage Area Network).

The hosts 100, for example, are connected to the management server 200 by way of a LAN or other such host management network CN 12. Further, the management server 200 is connected respectively to the storage apparatuses 300, 400, 500 via a LAN or other such storage management network CN 13.

Details of the respective storage apparatuses 300, 400, 500 will be explained below, but the storage apparatuses 300, 400, 500, for example, are interconnected via a LAN, SAN or other such copying network CN 14. The storage system can be constituted comprising three or more storage apparatuses. As will be explained below, the storage system can comprise four storage apparatuses, a migration-source storage apparatus, a migration-destination storage apparatus, an alternate storage apparatus, and an alternate storage apparatus candidate, but due to paper constraints, only three storage apparatuses are shown in the figure.

Furthermore, the above-mentioned network composition is one example, but the present invention is not limited to this. For example, the host management network CN 12 and the storage management network CN 13 can also be integrated. That is, a constitution in which the hosts 100, storage apparatuses 300, 400, 500 and management server 200 are connected to either one of the management networks is also acceptable.

Similarly, the constitution can also be such that the copying network CN 14 is done away with, and data copying is carried out between storage apparatuses using either the data input/output network CN 11 or the management network CN 13.

Similarly, the constitution can also be such that the management server 200 is connected to the data input/output network CN 11, and the collecting of management information, the issuing of instructions, and data copying are all executed using this network CN 11.

Next, details of the respective apparatuses of the storage system will be explained. To expedite the explanation, the constitutions of a host 100 and management server 200 will be explained first, and the constitutions of the respective storage apparatuses 300, 400, 500 will be explained thereafter.

Figure 3:
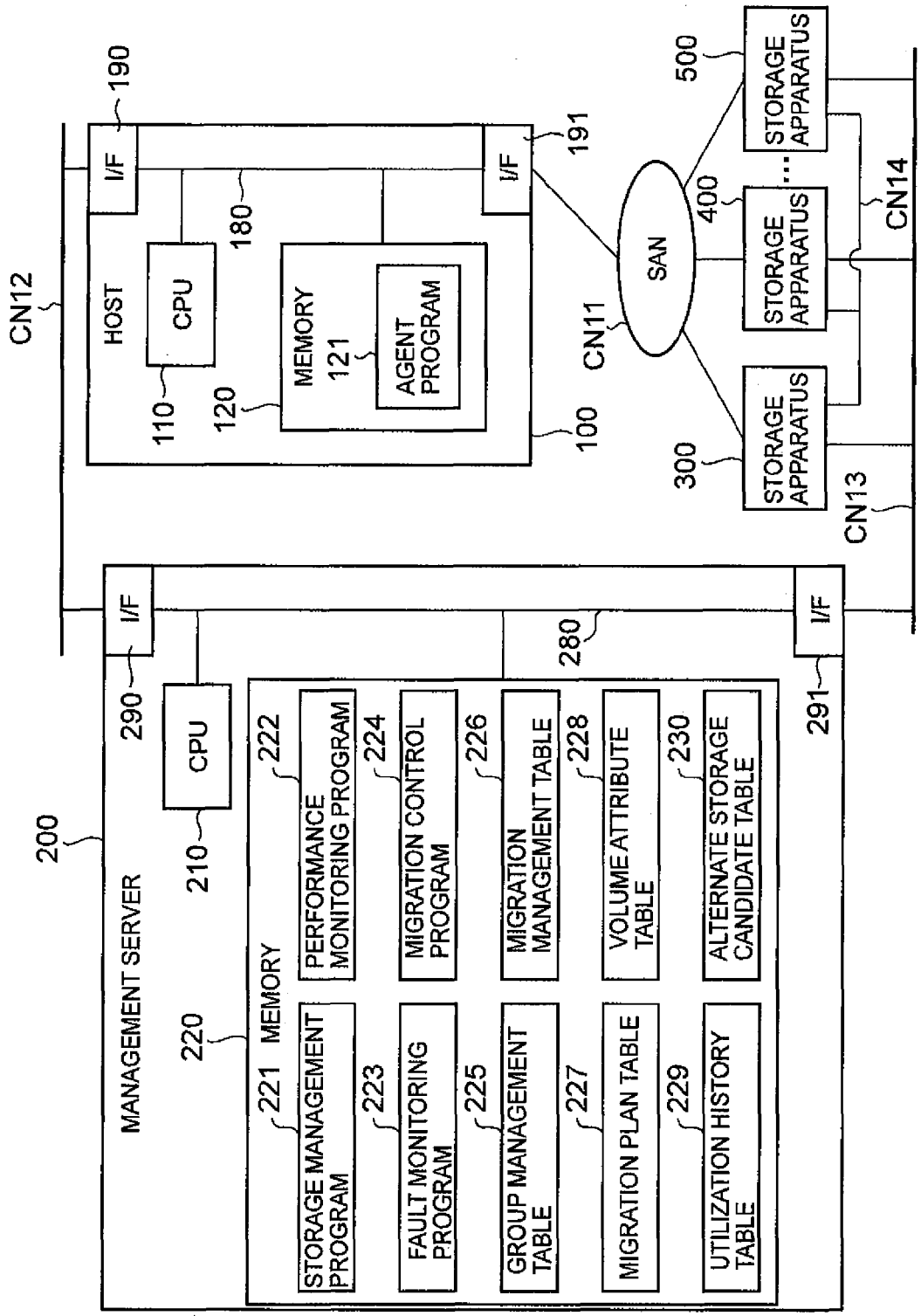
FIG. 3 is a block diagram focusing on the constitutions of a management server and host.

FIG. 3 is a schematic diagram showing the constitutions of the storage system host 100 and management server 200. The constitution of a host 100 will be explained. A host 100, for example, is constituted comprising a CPU (Central Processing Unit) 110; a memory 120; an interface ("I/F" in the FIG. 190 for connecting to the host management network CN 12; and an interface 191 for connecting to the data input/output network CN 11. These components 110, 120, 190, 191 are interconnected via a bus 180.

The functionality exhibited by a host 100 is achieved by the CPU 110 executing a program. Data and a program used by the CPU 110 are stored in the memory 120. In particular, the memory 120 stores an agent program 121. The agent program 121 is a program executed by the CPU 110, and is a program for transferring host 100 information to the management server 200.

Furthermore, in addition to the above-mentioned constitution, a host 100 comprises a user interface for exchanging information with a user. An information input apparatus such as a keyboard switch, and an information output apparatus such as a display are known as user interfaces, but since these interfaces are not directly related to the present invention, they have been omitted from the figure.

The management server 200, for example, has a CPU 210; a memory 220; an interface 290 for connecting to the host management network CN 12; and an interface 291 for connecting to the storage management network CN 13. These components 210, 220, 290, 291 are interconnected via a bus 280. The various below-described functions exhibited by the management server 200 are achieved by the CPU 210 executing a program.

The memory 220 stores data and programs utilized by the CPU 210. In particular, the memory 220 stores a storage management program 221; a performance monitoring program 222; a fault monitoring program 223; a migration control program 224; a group management program 225; a migration management program 226; a migration plan table 227; a volume attribute table 228; a utilization history table 229; and an alternate storage candidate table 230.

The storage management program 221 is a program executed by the CPU 210, and manages the configuration information of the storage apparatuses 300, 400, 500. Configuration information refers to the disk drive configuration, and volume configuration of the respective storage apparatuses 300, 400, 500.

The performance monitoring program 222 is a program executed by the CPU 210, and, for example, is a program for acquiring the performance information of the respective components of a storage apparatus, such as the controller loads of the respective storage apparatuses 300, 400, 500 under the management of the management server 200, the cache memory usage rate, and the logical volume usage rate.

The fault monitoring program 223 is a program executed by the CPU 210, and is a program for detecting a failure that occurs in the storage apparatuses 300, 400, 500, and determining the nature of the failure.

The migration control program 224 is a program executed by the CPU 210, and is a program for issuing migration processing control commands to a storage apparatus.

Next, the configurations of the respective tables 225 through 230 will be explained first, and the constitutions of the storage apparatuses 300, 400, 500 will be explained thereafter.

The group management table 225 is a table for defining a resource group for simultaneously migrating a plurality of volumes. An example of a group management table 225 is shown in FIG. 7. The group management table 225, for example, is constituted from three columns: resource group number 2251; parent resource group number 2252; and information for specifying a migration-source volume 2253.

A resource group number 2251, for example, is information for uniquely specifying a resource group constituted from associated volumes, like a group of volumes, which form a copy pair. A parent resource group number 2252 is information for uniquely specifying a group comprising a plurality of resource groups. That is, as will be explained hereinbelow together with FIG. 5, a plurality of resource groups inside the same storage apparatus, or a plurality of resource groups inside different storage apparatuses can be put together into a single parent resource group, and collectively migrated. Information for specifying a migration-source volume 2253 is constituted comprising an apparatus ID (identification information) for identifying a storage apparatus in which a migration-source volume exists, and a volume ID for identifying a volume. For example, "SS1.01" is information, which combines an apparatus ID "SS1" with a volume ID "01", and indicates that the volume specified as volume ID "01" of the volumes disposed inside the storage apparatus specified as "SS1" is the migration-source volume.

The migration management table 226 is a table for managing the data migration processing. As shown in FIG. 8, the migration management table 226, for example, is constituted from nine columns: a resource group number 2261; information 2262 for specifying a migration-source volume; information 2263 for specifying a migration-destination volume; a migration status flag 2264 for showing the state of progress of migration processing; information 2265 for identifying the host connected to the migration-source volume; and information 2266 for specifying an alternate volume of an alternate storage apparatus when changing the migration-destination storage apparatus. Here, a "0" is set in the migration status flag when data migration is complete, and a "1" is set when data migration is in progress.

The migration plan table 227 is a table for describing the contents of mid-process control processing executed midway through the data migration processing. As shown in FIG. 9, the migration plan table 227, for example, is constituted from six columns: a resource group number 2271; event type 2272; degree of progress 2273; nature of mid-process control process 2274; and restart time 2275.

The number of a resource group targeted for data migration is recorded in the resource group number 2271. The event type 2272 is information indicating the type of event observed in the migration-destination storage apparatus. As an event, a partial failure of the controller, a partial failure of a path, a partial failure of the power source, a partial failure of the cache memory, an increase in the load on the controller, and a failure of the migration-destination volume can be cited. These respective events become the triggers for executing mid-process control processing.

The degree of progress 2273 is information indicating the state of progress of the data migration processing, and, for example, is specified as a percentage. The degree of progress 2273, together with the event type 2272, constitutes an "execution condition" for commencing mid-process control processing. For example, when the degree of progress is set at "100% or less" in the event of a "partial failure of controller", mid-process control processing commences when the event "partial failure of controller" is detected despite the degree of progress. In the example shown in FIG. 9, "change migration destination" is carried out as the mid-process control process. That is, when a partial failure of the controller occurs, the migration-destination storage apparatus is changed to the alternate storage apparatus, and data migration processing is continued.

Various different degrees of progress can correspond to the same event, and the nature of mid-process control processing can be changed in accordance with the degree of progress. For example, in the example shown in FIG. 9, when an event called "load increase greater than set value" is detected, if the degree of progress of data migration processing is less than 50% at that time, the data migration processing is "canceled." However, when the degree of progress of data migration processing has already reached 51% or more when a "load increase greater than set value" event is detected, the data migration processing is "temporarily halted." The waiting time until restart is set at "1 hour".

Furthermore, a value can be set for the restart time 2275 only when the "temporary halt (interruption)" is set in the information 2274 indicating the nature of the mid-process control process. That is, when a failure or overload state occurs in the migration-destination storage apparatus, the data migration processing is interrupted for only the prescribed time recorded in restart time 2275, and data migration processing is restarted following the passage of the prescribed time period.

The details of a mid-process control process to be executed during data migration processing are stored in the nature of mid-process control process 2274. A mid-process control process is control, which is executed while data migration processing is being carried out, and control for changing the nature of the processing of commenced data migration processing.

For example, "cancel", "temporary halt (interruption)", and "change migration destination" can be cited as the nature of mid-process control process 2274. "Cancel" signifies the canceling of data migration processing that has been started. "Temporary halt" signifies temporarily halting the data migration processing that has been started, and restarting it after the passage of the restart time. "Change migration destination" signifies continuing data migration processing after changing the storage apparatus currently selected as the migration destination to another storage apparatus (alternate storage apparatus).

The volume attribute table 228 is a table, which expresses the volume configuration information of a storage apparatus related to data migration processing. The volume attribute table 228, as shown in FIG. 10, for example, is constituted from five columns: apparatus ID 2281; volume ID 2282; disk type 2283; RAID level 2284; and disk capacity 2285.

The utilization history table 229 is a table for describing the dynamic performance information of a storage apparatus related to data migration processing. As shown in FIG. 11, a utilization history table 229 is prepared for each targeted resource. For example, one utilization history table 229A manages the controller load history of a storage apparatus, and is constituted from three columns: measurement date/time 2291; apparatus ID 2292; and controller load 2293. One more utilization history table 229B manages the cache memory usage rate history instead of the controller load. Here, for example, the controller load and cache memory usage rate are shown in the figure, but the utilization history table 229 is not limited to these, and, for example, can also manage volume usage and parity group load histories.

The alternate storage candidate table 230 is the table utilized when changing the migration-destination storage apparatus in accordance with a mid-process control process. Alternate storage apparatus candidates are stored in the alternate storage candidate table 230. An alternate storage apparatus is a storage apparatus selected anew when a failure or the like occurs in the scheduled switchover destination storage apparatus (a new storage apparatus selected by a user) making it unusable. For example, an explanation will be given using M0 for the migration-source storage apparatus, M1 for the initial migration-destination storage apparatus at data migration, M2 for the switchover destination storage apparatus when a failure occurs in the initial migration destination storage apparatus M1, and M3 for the alternate storage apparatus. At the point in time at which the data migration processing commences, data is migrated from M0 to M1. When a failure or overload occurs in M1, data migration switches from M0 to M2. When a failure or the like occurs in M2 at the time of this switchover, rendering it unusable, M3 is selected in place of M2, and data is moved from M0 to M3.

As shown in FIG. 12, the alternate storage candidate table 230, for example, comprises three columns: resource group number 2301; volume ID 2302; and alternate volume candidate volume ID (array) 2303. For example, "SS5.01, SS6.01" in FIG. 12 indicate that a volume (volume ID=01) of a storage apparatus (apparatus ID=SS5), and a volume (volume ID=01) of a storage apparatus (apparatus ID=06) are storage volume candidates.

Furthermore, in addition to the above-mentioned constitution, the management server 200 comprises a user interface for exchanging information with a user, but this user interface will be omitted from the explanation since it does not correspond to the gist of the present invention.

The constitution of the storage apparatuses 300, 400, 500 will be explained by referring to FIG. 4. Focusing on the constitution of the storage apparatus 300, this storage apparatus 300, for example, comprises a control apparatus 301; a controller 310; a memory 320; a cache memory 330; a disk drive 340; and interfaces 390, 391, 392. These components 310, 320, 330, 340, 390, 391, 392 are connected by a bus 380.

The interfaces 390, 391, 392 will be explained first. The interface 390 is for connecting to the data input/output network CN 11, and the interface 391 is for connecting to the storage management network CN 13. The interface 392 is for connecting to the copying network CN 14.

The control apparatus 301 is an apparatus for controlling the operation of the storage apparatus 300. The control apparatus 301, for example, comprises a controller 310; a memory 320; and a cache memory 330.

The controller 310 can constitute a plurality of CPUs, and processes a read access and a write access from a host 100 by reading in and executing a program stored in the memory 320. The controller 310 comprises at least channel adapter functionality for sending and receiving data to and from a host 100, and disk adapter functionality for sending and receiving data to and from a disk drive 340. For example, the control substrate for channel adapter use and the control substrate for disk adapter use can be constituted separately, and channel adapter functionality and disk adapter functionality can each be provided on a single control substrate.

Further, the controller 310 achieves data copying functionality between volumes by executing a data migration program 321 stored in the memory 320. Inter-volume data copying can be broadly divided into copying within the same chassis, and copying between different chassis. Volume copying inside the same chassis is copying in which the copy-source (migration-source) volume and copy-destination (migration-destination) volume are disposed inside the same storage apparatus. Copying between different chassis is copying in which the copy-source (migration-source) volume and copy-destination (migration-destination) volume are disposed inside different storage apparatuses.

The memory 320 is also called a control memory, and in addition to the above-mentioned data migration program 321, stores a program and various types of control information for processing an access from a host 100. The cache memory 330 stores write data received from a host 100, and read data read out from a disk drive 340. Furthermore, the constitution can also be such that a portion of a common memory region is used as the memory 320, and the remainder is used as the cache memory 330.

The disk drive 340, for example, can be constituted as a hard disk drive, a semiconductor memory drive, an optical disk drive, or a magneto-optic disk drive. Further, citing a hard disk drive as an example, for instance, different types of drives, such as an FC (Fibre Channel) disk, and SATA (Serial AT Attachment) disk, can be mixed together.

A logical volume (hereinafter "volume") 342, which is a logical storage region, can be provided by using the physical storage region of the respective disk drives 340. Furthermore, in the figure, a logical volume is displayed as "LU" for convenience sake. A volume 342 can also be called a logical storage device. When heightening fault tolerance by using parity data, as with RAID 5, a parity group 341 is constituted from a plurality of disk drives 340. A volume 342 is used by a host 100.

Either one or a plurality of volumes 342 can be formed in a single disk drive 340, and a plurality of disk drives 340 can be used to form either one or a plurality of volumes 342.

Figure 4:
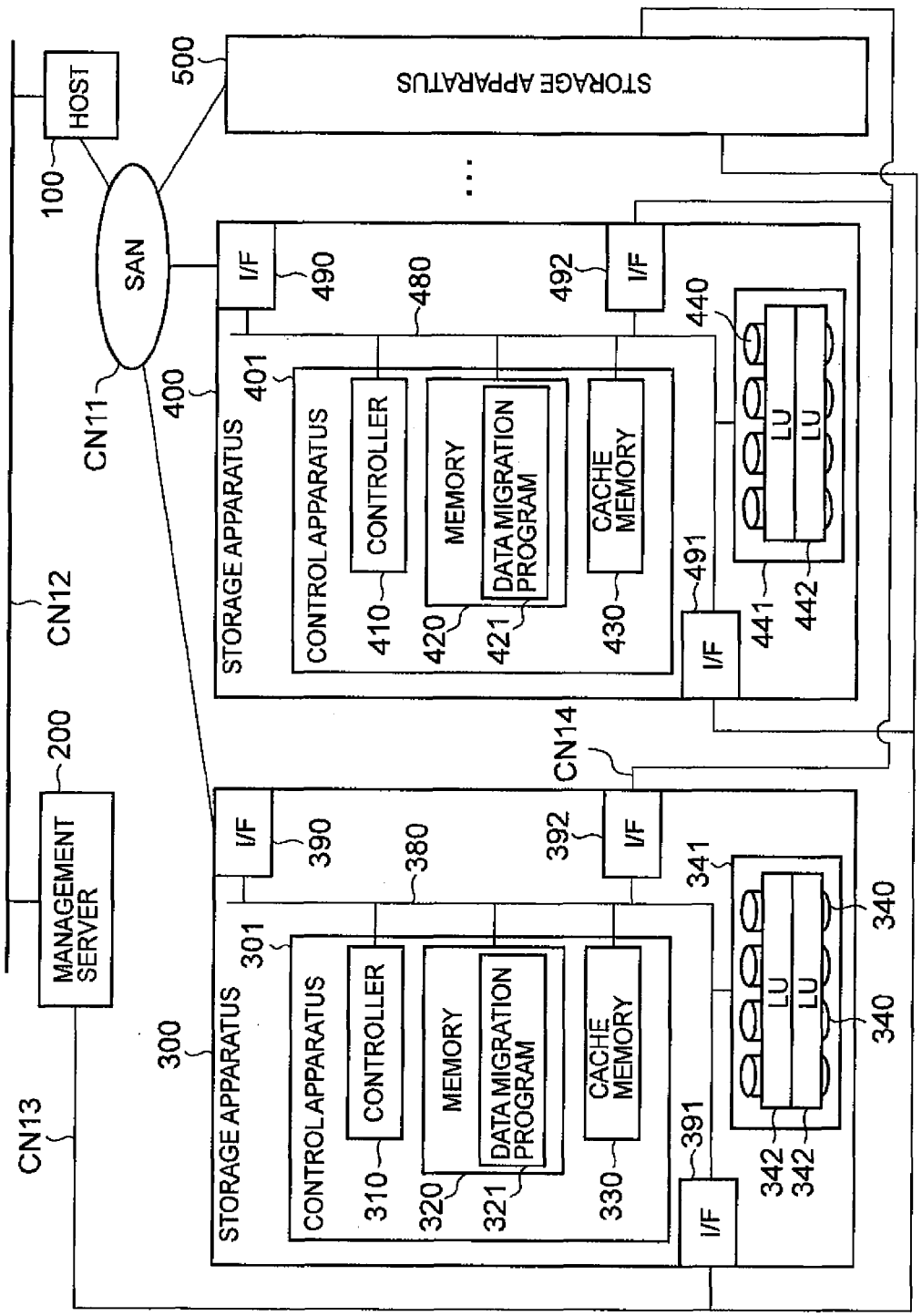
FIG. 4 is a block diagram focusing on the constitution of a storage apparatus.

As shown in FIG. 4, when a plurality of volumes 342 is prepared on common disk drives 340, there are cases in which a data access to one volume 342 will impact a data access of another volume 342. That is, an increased load on one volume 342 can cause the response performance of another volume 342 to decrease. In this case, it should be possible to improve response performance by moving either the one volume 342 or the other volume 342 to a different disk drive.

For example, if we represent a disk drive with a high access frequency as 340H, and a disk drive with a low access frequency as 340L, it should be possible to improve the response performance of a logical volume 342 by moving this logical volume 342 from disk drive 340H to disk drive 340L.

The data migration processing will be carried out to improve this kind of responsiveness. However, there is no guarantee that the data migration plan devised by a user will bear the desired result. This is because the state of a storage system is constantly fluctuating. Accordingly, in this embodiment, as will be explained hereinbelow, when collectively migrating a plurality of volumes, a data migration plan is either automatically or semi-automatically modified in accordance with the dynamically changing state of the storage system.

Storage apparatus 400 can be constituted the same as storage apparatus 300. That is, storage apparatus 400, for example, comprises a control apparatus 401; a controller 410; a memory 420; a cache memory 430; a disk drive 440; and interfaces 490, 491, 492, and these components 410, 420, 430, 440, 490, 491, 492 are connected by a bus 480.

Further, a data migration program 421 is stored in the memory 420, and this program 421 is read into and executed by the controller 410. In addition, a volume 442 is formed using the storage region of a disk drive 440.

Since storage apparatus 500 can have the same constitution as storage apparatus 300, a redundant explanation will be omitted. Furthermore, the basic constitution of the storage apparatuses 300, 400, 500 can be shared in common, and the model, functionality and other detailed specifications can differ. For example, a certain storage apparatus can be constituted as a higher functionality storage apparatus than another storage apparatus.

The data migration of a resource group will be explained using FIG. 5. In this embodiment, a resource group 801 is constituted from a plurality of volumes 342, and data is migrated collectively as a resource group. Further, a plurality of resource groups 801 can constitute a parent resource group 800, and an entire parent resource group 800 can be migrated. In other words, a sub-resource group can be set in the contents of a resource group.

Figure 5:
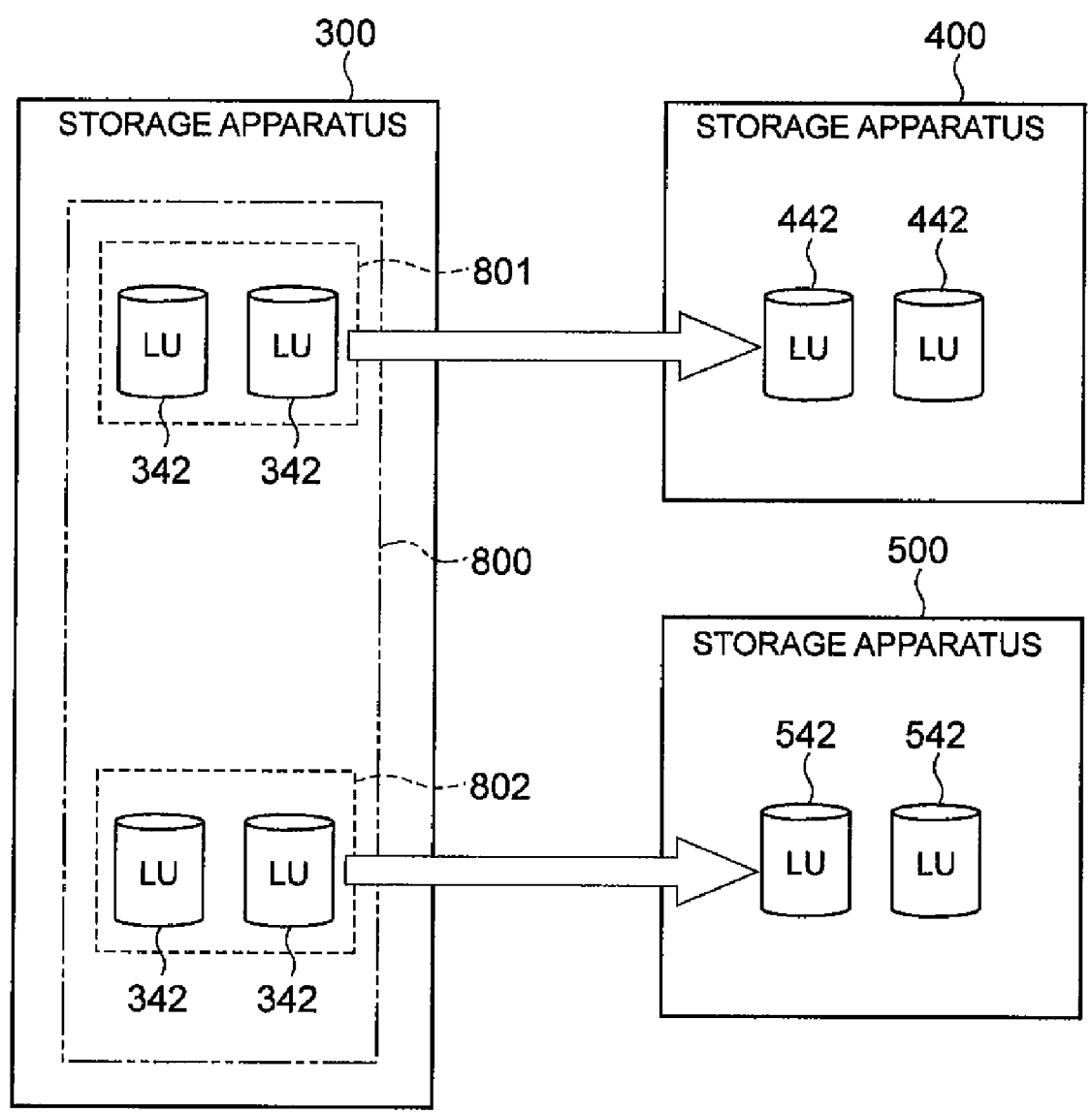
FIG. 5 is a diagram schematically showing how volumes are moved in resource group units.

As shown in FIG. 5, for example, a parent resource group 800 can be constituted from a plurality of resource groups 801 that exist inside the migration-source storage apparatus 300, and the parent resource group 800 can be migrated to a plurality of migration-destination storage apparatuses 400, 500 all at once. In this case, for example, one resource group 801 can be moved to storage apparatus 400, and the other resource group 802 can be moved to storage apparatus 500. Furthermore, the schematic diagram shown in FIG. 5 is for explaining a resource group data migration, and does not coincide with a specific example of the data migration processing, which will be explained hereinbelow.

Next, the operation of the storage system will be explained. Firstly, an overview of the data processing procedure will be explained. Prior to commencing the data migration processing, the user will specify a control method for modifying data migration processing in mid-process in preparation for the occurrence of a specified event during the course of data migration processing. This series of setup processes is called a migration plan, and that migration plan, which specifies the mid-process control method of the data migration processing, is called a mid-process control plan.

After a migration plan has been established by the user, data migration processing is commenced. The management server 200 measures the performance information of the respective storage apparatuses under management in preparation for searching out an alternate storage apparatus when a failure occurs during data migration processing. Then, when a specified event occurs during data migration processing, the processing method of the data migration processing is controlled mid-process in accordance with a previously set mid-process control plan.

Figure 6:
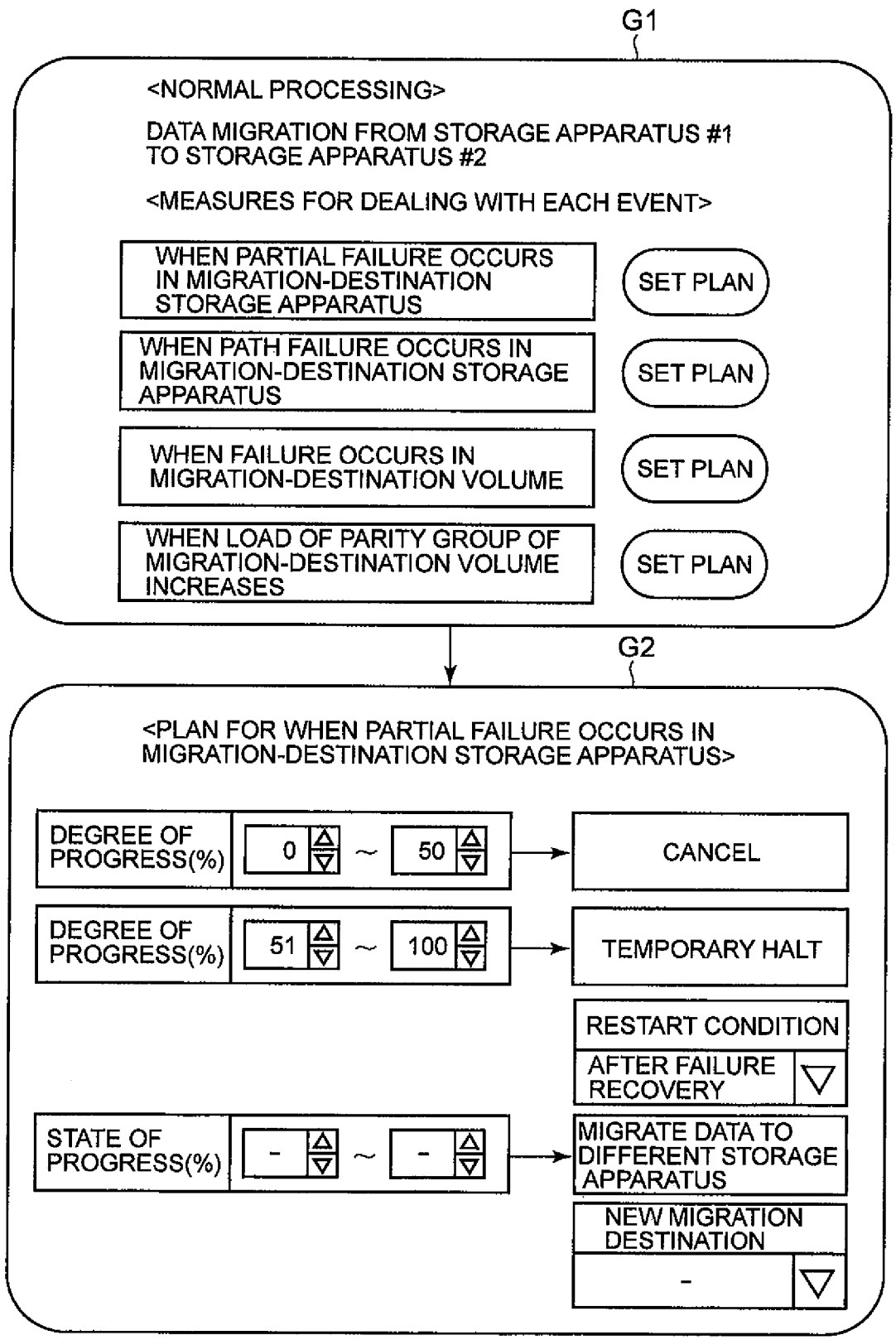
FIG. 6 is a schematic diagram showing the setup screen for setting a migration plan and a mid-process control plan.

FIG. 6 is a schematic diagram showing examples of the setup screens used by a user in a setup operation. These setup screens G1, G2 are provided to the user from the management server 200. A data migration can be performed as a resource group as described hereinabove. As shown in the upper portion of the main setup screen G1, both the migration-source storage apparatus and the migration-destination storage apparatus are specified. Furthermore, although not shown in the figure, a resource group number and migration-destination volume ID are also specified at the time the migration-source storage apparatus and the migration-destination storage apparatus are specified.

Further, in the main setup screen G1, a method for modifying the data migration processing when a specified event occurs (a mid-process control processing method) can be specified beforehand for each of various specified events. For example, "partial failure of migration-destination storage apparatus", "path failure in migration-destination storage apparatus", "failure of migration-destination storage apparatus", and "increased load on parity group of migration-destination storage apparatus" can be cited as specified events.

When the user operates the "set plan" button, processing moves to the sub-setup screen G2 for setting the countermeasure to a specified event (mid-process control processing method). This sub-setup screen G2 (it can also be called the detailed setup screen) is provided for each specified event. In this sub-setup screen G2, the details of mid-process control processing can be set in accordance with the degree of progress of the data migration processing.

The sub-setup screen G2 shows the various settings that can be made when the specified event "partial failure of migration-destination storage apparatus" occurs, such as canceling the data migration processing if the degree of progress is within the range of 0% to 50%, and temporarily halting the data migration processing when the degree of progress is greater than 51%. Further, as shown at the bottom of the sub-setup screen G2, it is also possible to make a setting that changes the storage apparatus of the data migration destination in accordance with the degree of progress of the data migration processing. Furthermore, the management server 200 can also check in advance to make sure that conflicting settings have not been made for the same resource group.

Figure 13:
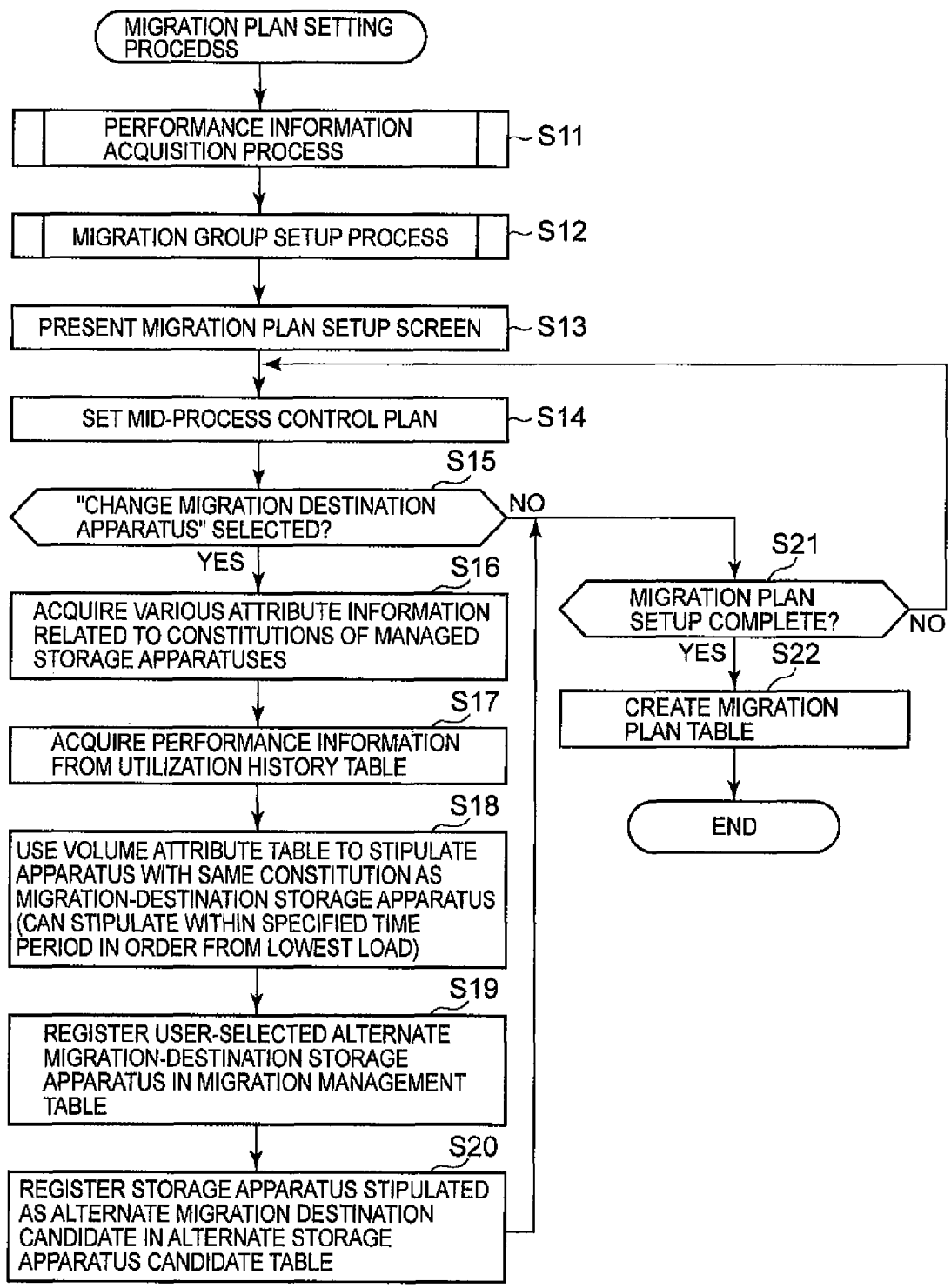
FIG. 13 is a flowchart showing a migration plan setting process.

FIG. 13 is a flowchart showing the procedure for a migration plan setting process carried out prior to commencement of the data migration processing. Furthermore, the flowchart shows the procedure within a scope required for understanding and executing the present invention, but this procedure will differ from that of an actual program. The same also holds true for the other flowcharts explained hereinbelow. In the following explanation, a step will be annotated as "S".

Further, although the operating unit of the respective flowcharts hereinbelow will in fact be either the CPU or controller that executes the control program stored in memory, for explanation purposes, there will be times when either the management server 200 or the respective storage apparatuses 300, 400, 500 will be described as the operation unit.

First of all, the CPU 210 of the management server 200 respectively checks the performance (controller load, cache memory usage rate, volume usage rate) of each storage apparatus under its management in accordance with the sequence of the performance monitoring program 222, and stores the collected performance information in the utilization history table 229 (S11). The procedure for acquiring this performance information will be explained together with FIG. 14 hereinbelow.

Next, a migration group setting process is carried out (S12). The details of this migration group setting process will be explained below together with FIG. 15. Furthermore, this embodiment will be explained using an example of when a resource group does not comprise a sub-resource group, that is, when a parent resource group 800 is not established.

After completing the migration group setting process, the management server 200 provides the user with the migration plan setup screens G1, G2 described together with FIG. 6 (S13). The user utilizes the main setup screen G1 to set a migration plan (S14).

Next, the management server 200 determines whether or not "change migration destination" has been selected as the mid-process control plan (S15). "Change migration destination", as explained hereinabove, is a plan for continuing the data migration processing by switching from the initial migration-destination storage apparatus set by the migration plan to an alternate storage apparatus.

When "change migration destination" has been set by the user (S15: YES), the management server 200 acquires attribute information from the volume attribute table 228 (S16). The management server 200 also acquires dynamic performance information from the utilization history table 229 (S17). Then, based on the information of the volume attribute table 228, the management server 200 presents the user with either one or a plurality of alternate volumes of the same constitution as the migration-destination storage apparatus (S18).

At this point, within a user-specified time period, the management server 200, for example, can also present the user with alternate volumes in sequence from the one with the lowest load. By providing a user with this kind of additional information, the user is able to select the volume with the lowest load as the alternate volume, thereby enhancing usability.

When an alternate storage apparatus (alternate volume) has been selected by the user, the management server 200 registers the storage apparatus selected as the alternate migration destination in the migration management table 226 (S19).

In this embodiment, for explanation purposes, the example given is one in which storage apparatus 300 is the migration-source storage apparatus, storage apparatus 400 is the migration-destination storage apparatus, and storage apparatus 500 is the alternate storage apparatus.

Next, the management server 200 makes all the alternate storage apparatuses detected in S18 candidate alternate storage apparatuses, and saves this information in the alternate storage candidate table 230 (S20). That is, in preparation for a situation in which a failure occurs in the alternate storage apparatus selected in the mid-process control plan, the management server 200 targets the alternate storage apparatus candidates for monitoring as well. By detecting the alternate storage apparatus candidates in advance at alternate storage apparatus setup time like this, the mid-process control plan can be smoothly executed even when it is not possible to switch over to the alternate storage apparatus.

The management server 200 determines whether or not the migration plan setup is complete (S21). When the migration plan setup is not finished (S21: NO), processing returns to S14, and the migration plan setup operation is restarted. When the entire migration plan setup is finished (S21: YES), the management server 200 creates and saves a migration plan table 227. This ends pre-setup prior to the commencement of the data migration processing.

Figure 14:
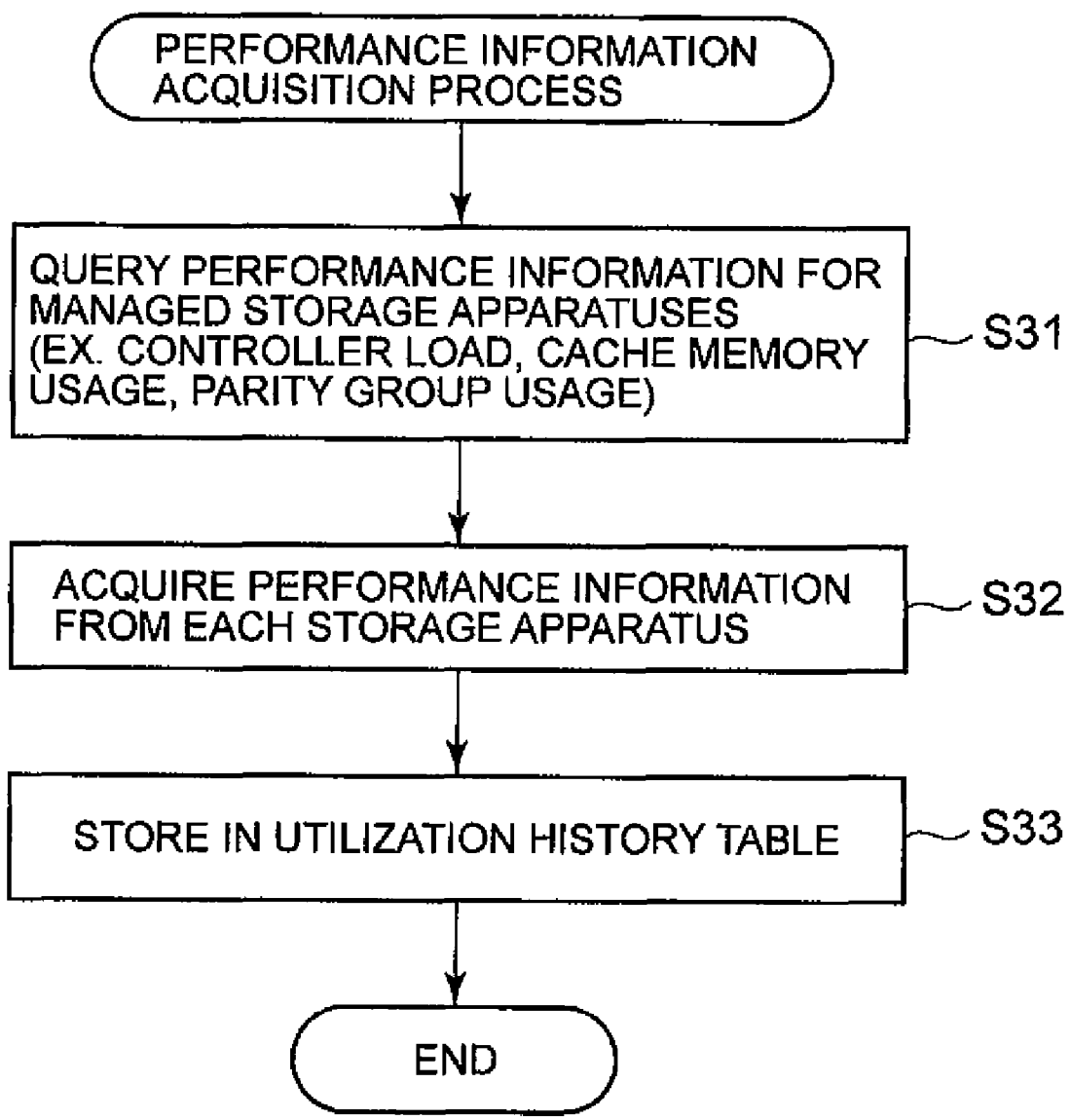
FIG. 14 is a flowchart showing the process for acquiring performance information in FIG. 13.

FIG. 14 is a flowchart showing the details of the performance information acquisition procedure described in S11 in FIG. 13. The management server 200, for example, queries each of the storage apparatuses under its management as to controller load, cache usage (utilization rate), and the channel processor load rate (S31). Furthermore, a channel processor is a processor for controlling the sending and receiving of data to and from a host 100.

Next, when the management server 200 acquires performance information from each of the respective storage apparatuses (S32), it makes the apparatus ID and acquisition time correspondent to this acquired performance information, and saves it to the utilization history table 229 (S33).

Figure 15:
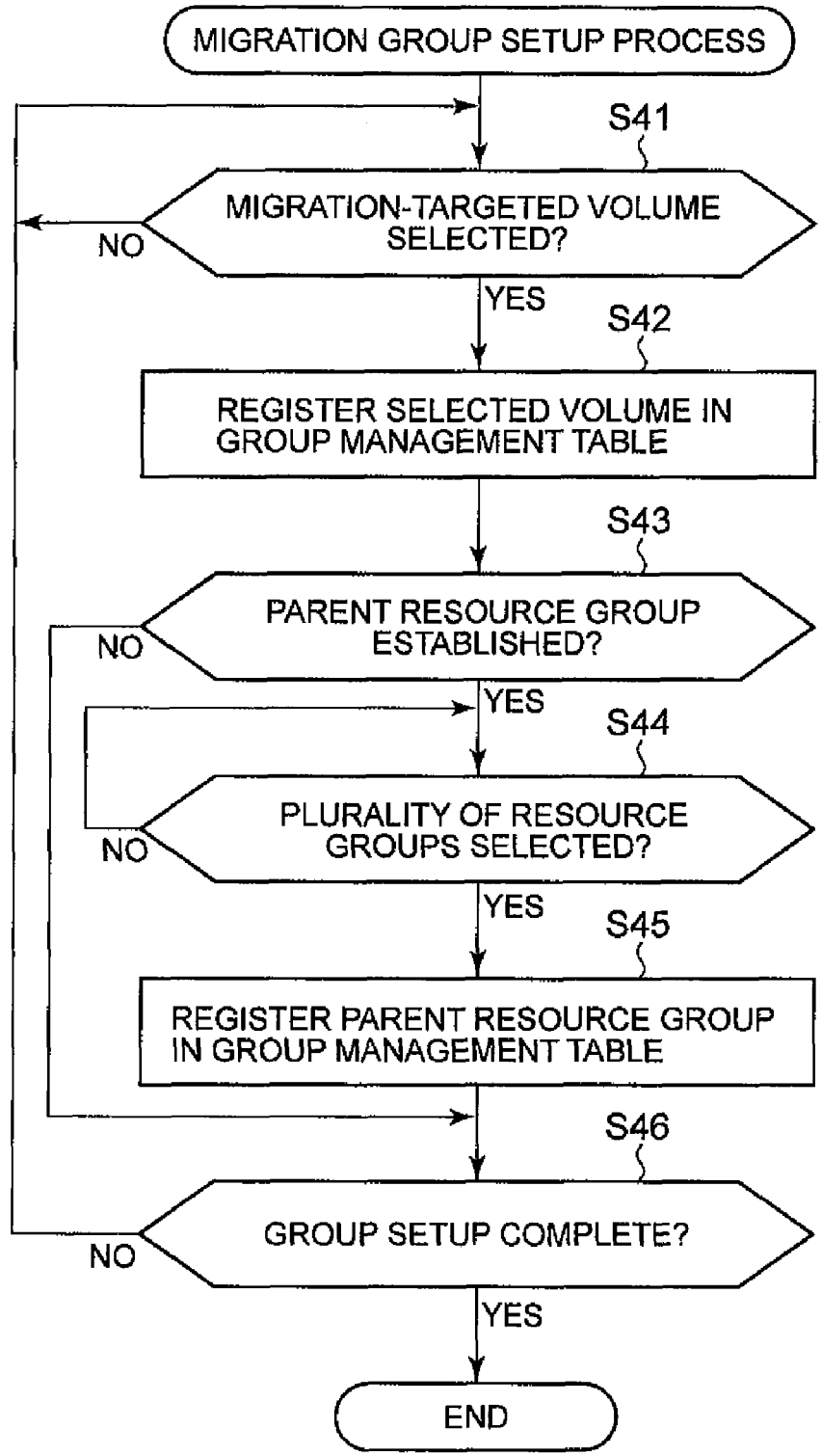
FIG. 15 is a flowchart showing the migration group setting process in FIG. 13.

FIG. 15 is a flowchart showing the details of the migration group setting process described in S12 in FIG. 13. First, the management server 200 determines if a volume targeted for migration (migration-source volume) was selected by the user (S41).

When a migration-source volume has been selected by the user (S41: YES), the management server 200 registers the selected migration-source volume in the group management table 225 (S42). The management server 200 determines whether or not a parent resource group will be set (S43). That is, it determines whether or not a plurality of resource groups will be put together into one resource group (a parent resource group), and migrated all at once.

When a parent resource group is to be set (S43: YES), the management server 200 determines whether or not a plurality of resource groups was selected by the user (S44). When a plurality of resource groups has been selected (S44: YES), the management server 200 registers a parent resource group, which will be constituted from the plurality of resource groups selected by the user, in the group management table 225 (S45).

The management server 200 determines whether or not the setup task for the migration targeted group is complete (S46), and when it is not complete (S46: NO), it returns processing to S41. When the setup task by the user is complete (S46: YES), this process ends. Furthermore, when a parent resource group is not established (S43: NO), S44 and S45 are skipped, and processing moves to S46.

Figure 16:
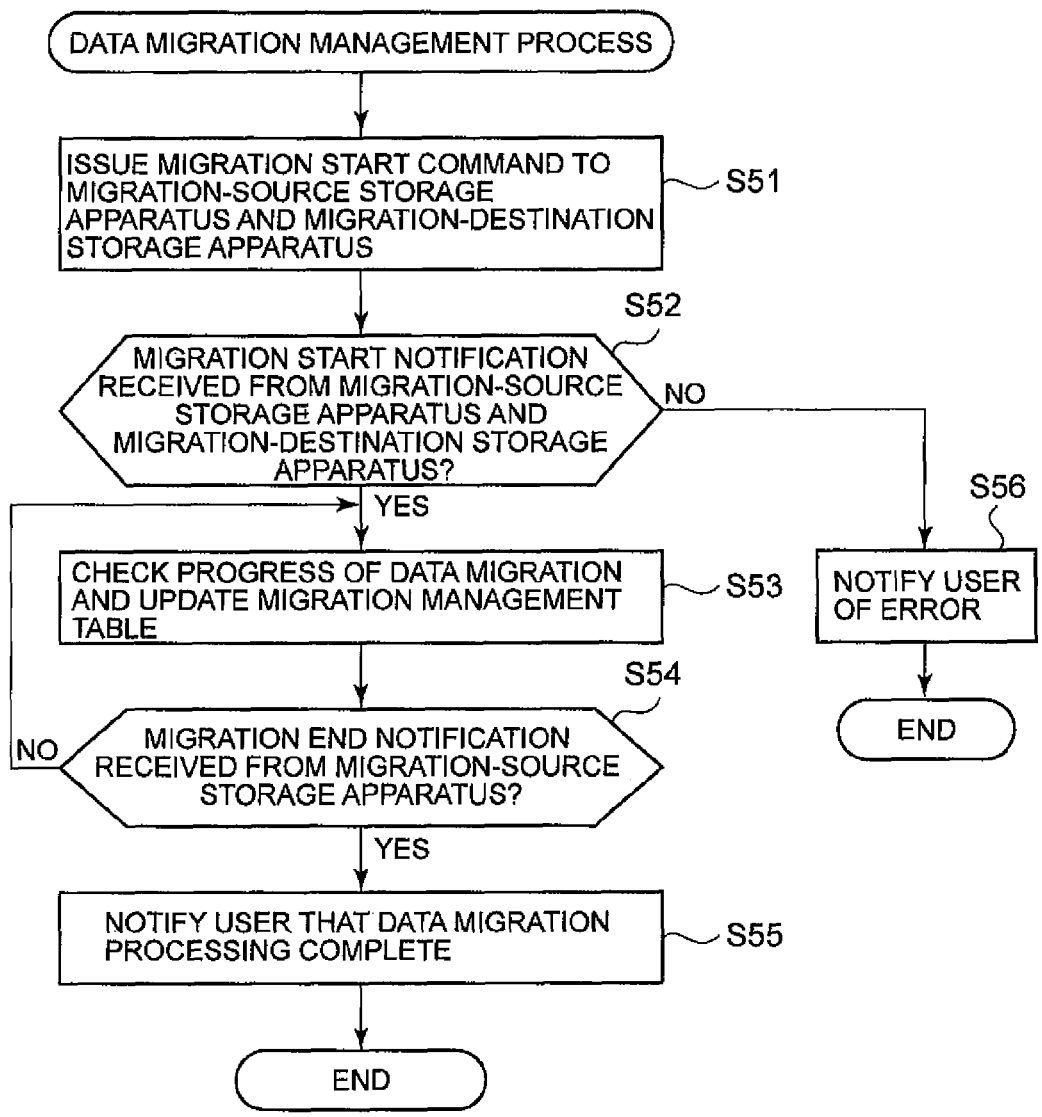
FIG. 16 is a flowchart showing the data migration management process.

FIG. 16 shows the processing procedure (the data migration processing management procedure) when the data migration processing is started. First, the CPU 210 of the management server 200 issues a migration start command to each of the migration-source storage apparatus 300 and the migration-destination storage apparatus 400 according to the sequence of the migration control program 224 (S51).

Next, the management server 200 determines whether or not a migration process start notification has been received from both the migration-source storage apparatus 300 and the migration-destination storage apparatus 400 (S52). The CPU 210 of the management server 200 checks, either on a regular or irregular basis, the progress of the data migration processing in accordance with the sequence of the storage management program 221, and updates the migration management table 226 as needed (S53).

The management server 200 determines if migration process complete has been notified from the migration-source storage apparatus 300 (S54), and when a migration process complete notification is received from the migration-source storage apparatus 300 (S54: YES), it notifies the user to the effect that data migration processing is complete (S55).

However, when a migration start notification cannot be received from both the migration-source storage apparatus 300 and the migration-destination storage apparatus 400 (S52: NO), the management server 200 notifies the user of an error (S56). This is because data migration processing could not be started.

Furthermore, the data migration processing complete notification and error notification, for example, can be achieved by virtue of a message displayed on a management server 200 terminal screen. Or, the constitution can also be such that the user is notified using e-mail.

Figure 17:
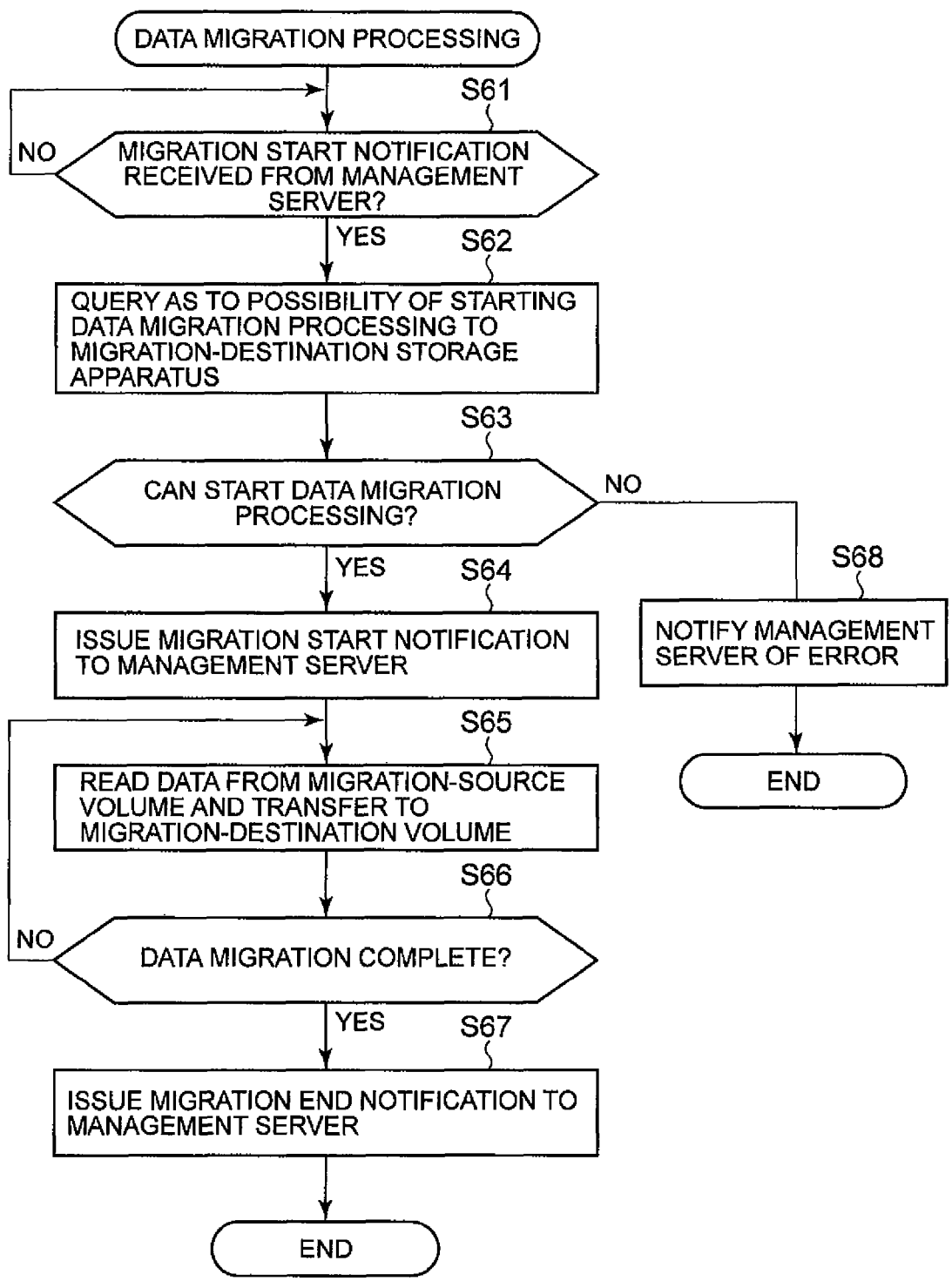
FIG. 17 is a flowchart showing data migration processing.

FIG. 17 is a flowchart showing data migration processing. This data migration processing, for example, is executed by the migration-source storage apparatus 300. Furthermore, the constitution can also be such that data is migrated by virtue of the migration-destination storage apparatus 400 reading the data from the migration-source storage apparatus 300.

The migration-source storage apparatus 300 determines whether or not a migration start notification (S51 of FIG. 16) was received from the management server 200 (S61). When a migration start notification was received (S61: YES), the controller 310 of the migration-source storage apparatus 300 queries the migration-destination storage apparatus 400 as to whether or not data migration processing can commence in accordance with the sequence of the data migration program 321 (S62).

The migration-source storage apparatus 300 (more specifically, the controller 310) determines whether or not to commence data migration processing (S63). When it is determined that commencement of data migration processing is possible (S63: YES), the migration-source storage apparatus 300 sends a migration start notification to the management server 200 (S64).

The migration-source storage apparatus 300 reads out data from the migration-source volume, and transfers this read-out data to the migration-destination storage apparatus 400 (S65). The migration-destination storage apparatus 400, after temporarily storing the data received from the migration-source storage apparatus 300 in the cache memory 430, writes this data to the migration-destination volume.

The migration-source storage apparatus 300 makes a determination as to whether or not volume copying was completed, that is, whether or not all of the data of the migration-source volume was copied to the migration-destination volume (S66). S65 and S66 are repeatedly executed until data migration is complete for all the migration-source volumes constituting a resource group.

When data migration is complete (S66: YES), the migration-source storage apparatus 300 sends a migration end notification to the management server 200 (S67). However, when the migration-source storage apparatus 300 determines that data migration processing cannot commence (S63: NO), the migration-source storage apparatus 300 notifies the management server 200 of an error (S68).

Figure 18:
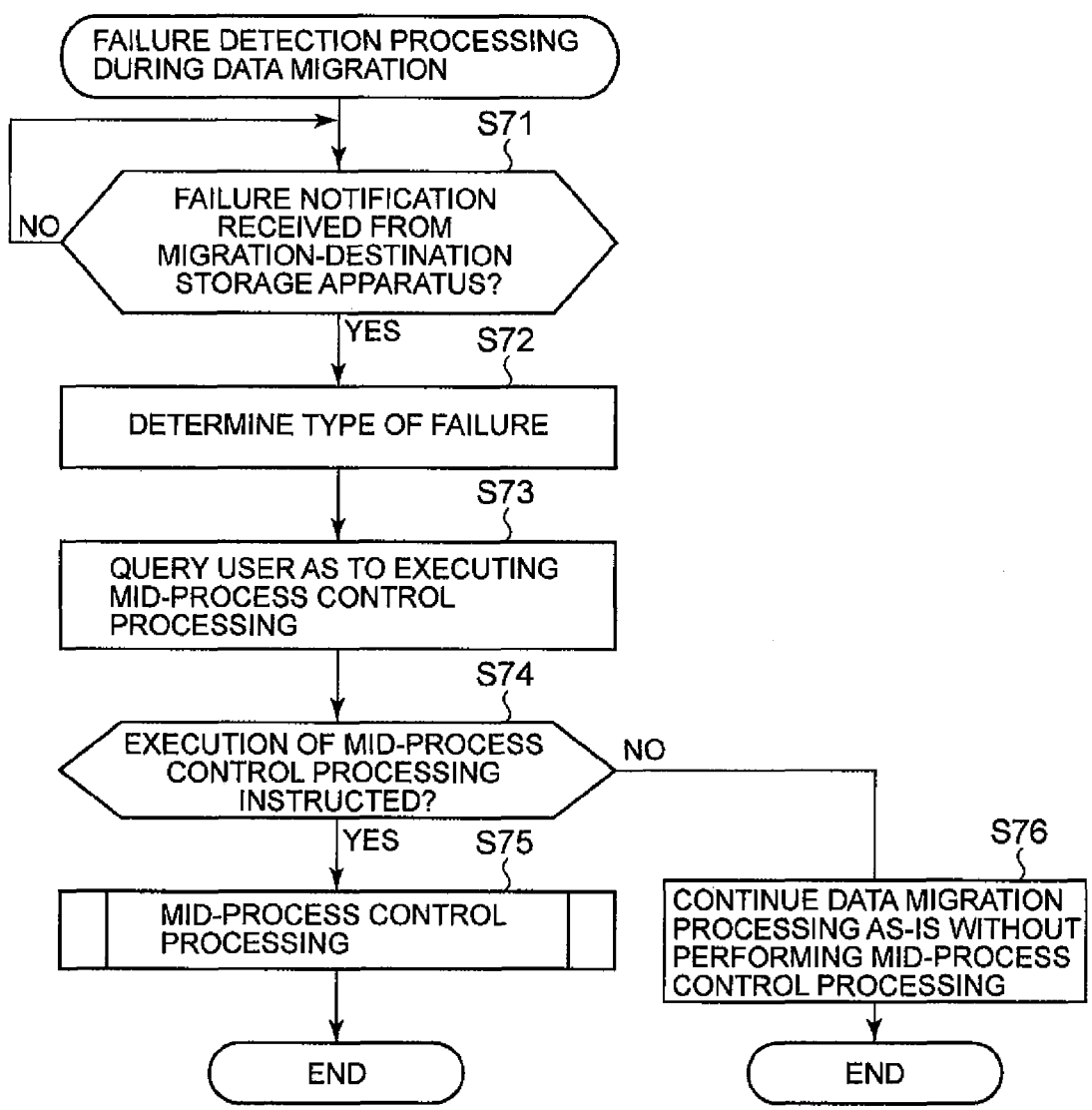
FIG. 18 is a flowchart showing the processing when a failure occurs in the migration-destination storage apparatus during data migration.

FIG. 18 is a flowchart showing the processing procedure when a failure occurs in the migration-destination storage apparatus 400 while data migration processing is being executed. This processing is executed by the management server 200.

First, the management server 200 determines whether or not a failure notification was received from the migration-destination storage apparatus 400 (S71). As types of failures, for example, partial failure of the controller 410, partial failure of the cache memory 430, partial failure of a volume 450, and partial failure of the power source can be cited.

When a failure notification is received from the migration-destination storage apparatus 400 (S71: YES), the management server 200 determines the type of failure based on the information received from the migration-destination storage apparatus 400 (S72). The management server 200, on the basis of the type of failure determined and the migration plan table 227, queries the user as to the propriety of executing the mid-process control process set relative to this failure (S73).

When the user gives instructions for the mid-process control process to be executed (S74: YES), that is, when changing the data migration processing midway through that processing is approved by the user, the management server 200 executes mid-process control processing (S75). Changing the data migration processing method during a data migration will be explained hereinbelow together with FIG. 19.

By contrast, when the user does not give instructions to execute mid-process control processing (S74: NO), the management server 200 continues data migration processing as-is without carrying out the pre-set mid-process control process (S76).

Figure 19:
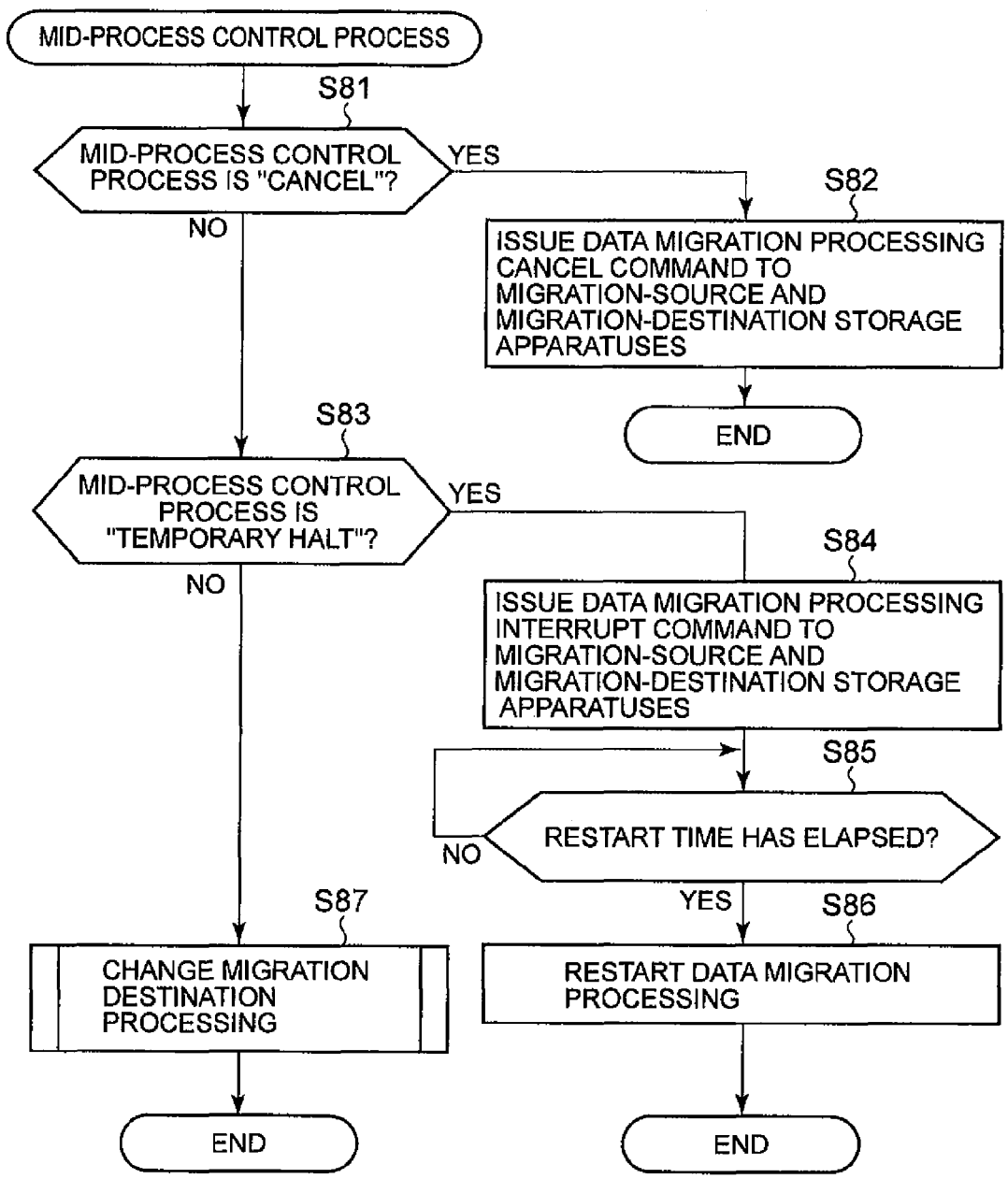
FIG. 19 is a flowchart showing the mid-process control process.

Next, FIG. 19 is a flowchart showing the procedure of the mid-process control process described in S75 in FIG. 18. First, the management server 200 determines whether or not the type of mid-process control process (the nature of the mid-process control process) selected beforehand by the user is "cancel" (S81).

When the user has specified in advance to cancel the data migration processing (S81: YES), the management server 200 instructs the migration-source storage apparatus 300 and migration-destination storage apparatus 400 to stop (cancel) data migration processing (S82).

When the mid-process control process selected by the user is not "cancel" (S81: NO), the management server 200 determines whether or not the mid-process control process selected by the user is "temporary halt" (S83).

When the user has specified in advance to temporarily halt the data migration processing (S83: YES), the management server 200 instructs the migration-source storage apparatus 300 and migration-destination storage apparatus 400 to temporarily halt data migration processing (S84). Then, after instructing the temporary halt, the management server 200 waits for the prescribed restart time to elapse (S85), and when the restart time has elapsed (S85: YES), it instructs the migration-source storage apparatus 300 and migration-destination storage apparatus 400 to restart data migration processing (S86).

When the user-specified mid-process control processing method is neither "cancel" nor "temporary halt" (S83: NO), the management server 200 executes "change migration destination processing" (S87). This change migration destination process will be explained hereinbelow together FIG. 20.

Figure 20:
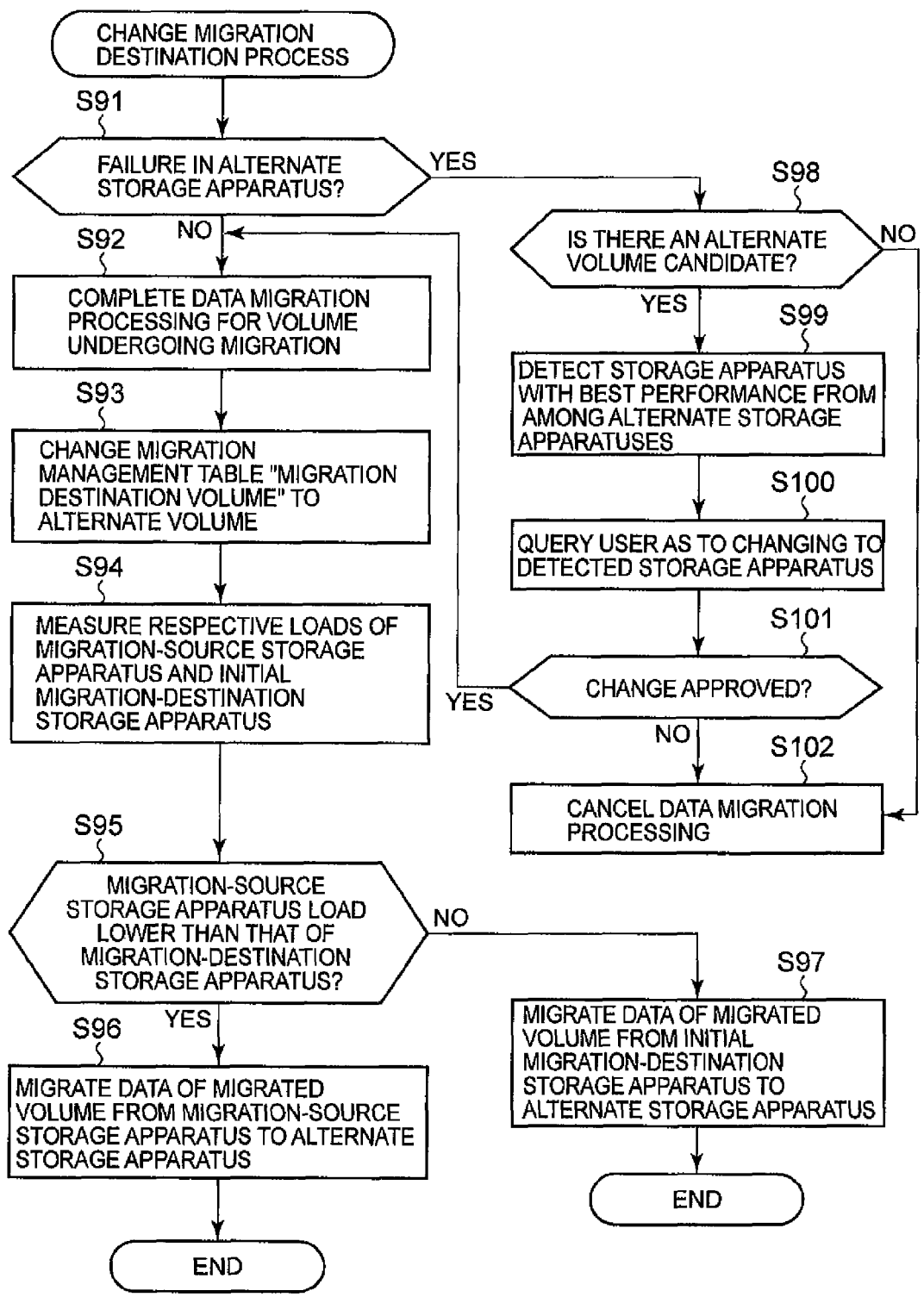
FIG. 20 is a flowchart showing the process for changing the migration destination in FIG. 19.

FIG. 20 is a flowchart showing the details of the change migration destination processing described in S87 in FIG. 19. In change migration destination processing, when the initially scheduled migration-destination storage apparatus cannot be utilized, the migration destination is switched to the alternate storage apparatus 500, or to another different alternate storage apparatus, and data migration processing is continued.

First, the management server 200 determines whether or not a failure has occurred in the previously registered alternate storage apparatus 500 (S91). That is, it makes a determination as to whether or not the alternate storage apparatus 500 can be used as the new migration-destination storage apparatus.

When a failure has not occurred in the previously registered alternate storage apparatus 500 (S91: NO), the management server 200 completes data migration for the volume undergoing data migration (S92). Next, the management server 200 overwrites the "migration-destination volume" in the migration management table 226 to reflect the alternate volume of the alternate storage apparatus 500 (S93).

The management server 200 measures the respective controller loads of the initially set migration-destination storage apparatus 400 and migration-source storage apparatus 300 (S94). When the load of the migration-source storage apparatus 300 is lower than that of the migration-destination storage apparatus 400 (S95: YES), the management server 200 migrates a migrated volume from the migration-source storage apparatus 300 to the alternate storage apparatus 500 (S96). By contrast, when the load of the migration-destination storage apparatus 400 is lower than that of the migration-source storage apparatus 300 (S95: NO), the management server 200 migrates a migrated volume from the migration-destination storage apparatus 400 to the alternate storage apparatus 500 (S97).

That is, for a volume that has already been migrated to the migration-destination storage apparatus 400, data is copied from either the migration-source storage apparatus 300 or the migration-destination storage apparatus 400, whichever one has the least controller load, to the alternate storage apparatus 500.

However, when a failure occurs in the alternate storage apparatus 500 previously selected by the user, and this alternate storage apparatus 500 cannot be utilized (S91: NO), the management server 200 determines whether or not an alternate volume candidate is registered in the alternate storage candidate table 230 (S98).

When an alternate volume candidate exists (S98: YES), and a plurality of storage apparatuses are listed as candidates in the alternate storage candidate table 230, the management server 200 detects from among these plurality of candidates the storage apparatus with the best performance (S99).

The management server 200 presents this detected storage apparatus to the user, and queries the user if this newly detected alternate storage apparatus can be used in place of alternate storage apparatus 500 (S100).

When approval for the change is obtained from the user (S101: YES), processing moves to S92, and data migration processing is carried out using the new alternate storage apparatus as described hereinabove (S92 through S97). When approval is not obtained from the user (S101: NO), the management server 200 cancels data migration processing (S102). Further, when there is not even one alternate volume candidate (S98: NO), the management server 200 cancels data migration processing (S102).

Figure 21:
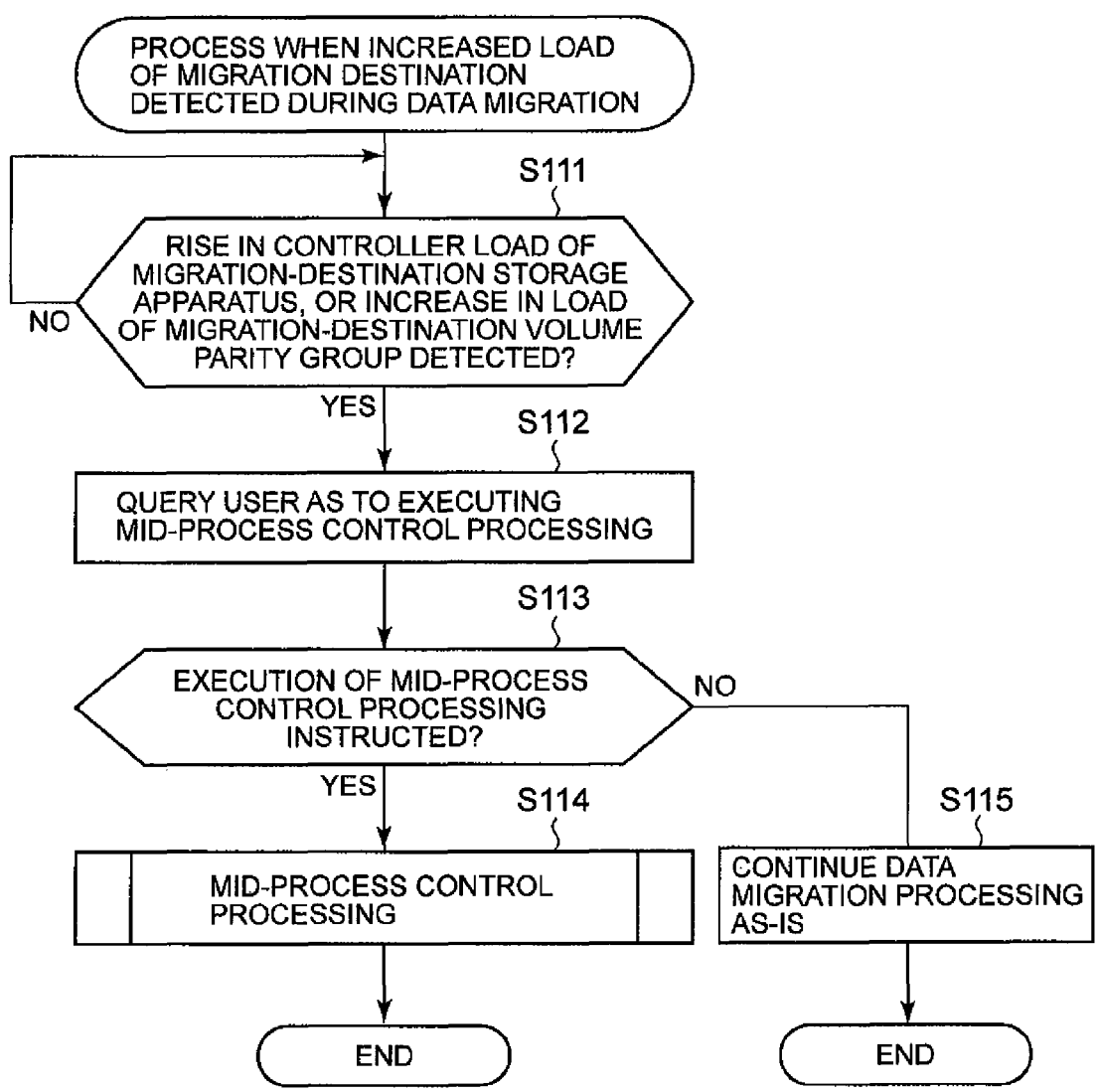
FIG. 21 is a flowchart showing the processing when a load increase is detected in the migration destination during data migration.

FIG. 21 is a flowchart showing the processing procedure when the load on the migration destination storage apparatus 400 increases during data migration processing. The management server 200 determines whether or not the controller load of the migration destination storage apparatus has risen, or whether or not the load (disk I/O) of the parity group 441 to which the migration-destination volume 442 belongs has increased (S111).

Then, when a controller or parity group load increase is detected (S111: YES), the management server 200 queries the user as to the propriety of executing mid-process control processing (S112). When the user instructs the execution of mid-process control processing (S113: YES), the mid-process control processing described in FIG. 19 and FIG. 20 is executed (S114).

By contrast, when the user does not instruct the execution of mid-process control processing (S113: NO), that is, when the user does not desire that mid-process control processing commence, the management server 200 continues the current data migration processing as-is without modification (S115).

Since this embodiment is constituted as described hereinabove, the following effect is achieved. In this embodiment, the constitution is such that the data migration processing method can be modified or changed in the middle of data migration processing on the basis of the state of the migration-destination storage apparatus 400. Therefore, it is possible to prevent useless data migration processing from being executed as-is, or to prevent a situation in which the desired result is not obtained subsequent to data migration.

In addition, after a user ascertains that the initial migration plan has failed, there is no need to devise and re-set a new migration plan. By simply setting a mid-process control plan beforehand, the user can achieve the desired data migration in a dynamically changing storage system. Thus, this embodiment can improve the workability of data migration processing, and can enhance user ease-of-use.

In the present invention, at the point in time when the user selects the alternate storage apparatus 500, all candidate storage apparatuses capable of being used in place of the alternate storage apparatus 500 are detected in advance, and the performance information of these candidate storage apparatuses (candidates for alternate storage apparatus) is collected ahead of time. Therefore, even when it is not possible to switch from the migration-destination storage apparatus 400 to the alternate storage apparatus 500, another alternate storage apparatus can rapidly be proposed to the user, thereby enhancing usability.

In this embodiment, for a migrated volume, either the migration-source storage apparatus 300 or the migration-destination storage apparatus 400, whichever has the least controller load, is selected, and an already migrated volume is migrated to the alternate storage apparatus. Therefore, the load inside the storage system can be balanced, making it possible to prevent load from concentrating in a specific storage apparatus.

In this embodiment, a plurality of volumes can be collected together into a resource group, and migrated collectively at the same time. Therefore, for example, a plurality of mutually associated volumes, like a plurality of volumes in a copy pair relationship, can be migrated simultaneously, enhancing usability.

In particular, when a group of a plurality of associated volumes is collectively subjected to data migration, it is apt to take a long time before the data migration processing is complete. However, in a storage system that is capable of continuous operation 24 hours a day, 365 days a year, the state of the storage system changes from one minute to the next. Therefore, there is no guarantee that the state of the storage system when the migration plan was devised will continue subsequent to the completion of data migration processing. Accordingly, in this embodiment, in order to carry out data migration for a group of a plurality of associated volumes in a storage system whose state changes in various ways, performance information regarding the migration-destination storage apparatus 400 and alternate storage apparatus 500, as well as the alternate storage apparatus candidates is collected on a regular basis, and data migration processing is modified as needed in accordance with the state of the migration-destination storage apparatus 400. This increases the likelihood of being able to achieve user-desired data migration in a storage system comprising a plurality of storage apparatuses 300, 400, 500, . . . , and thus enhances usability.

In this embodiment, all alternate volume candidates are extracted in advance prior to commencing the data migration processing. That is, of the volumes available at the start of data migration processing, all those volumes available as migration-destination volumes are extracted. Instead of this, the constitution can also be such that an alternate volume is newly created when searching for an alternate volume. However, in this case, it takes time until the switch to the alternate volume is made, generating temporal gaps in the flow of processing for data migration, and making it impossible to carry out rapid data migration. By contrast, in this embodiment, because alternate volume candidates are extracted beforehand and monitored by the management server 200, it is possible to rapidly switch the migration destination and continue data migration processing even when a failure occurs in the alternate storage apparatus 500.

Second Embodiment

A second embodiment of the present invention will be explained based on FIGS. 22 and 23. In this embodiment, a group of migration-source volumes, which are distributed and arranged in a plurality of storage apparatuses, is migrated all at once to a plurality of migration-destination storage apparatuses. Since each of the following embodiments, to include this embodiment, correspond to variations of the above-mentioned first embodiment, redundant explanations will be omitted, and the focus will be on explaining the points of difference with the first embodiment.

Figure 22:
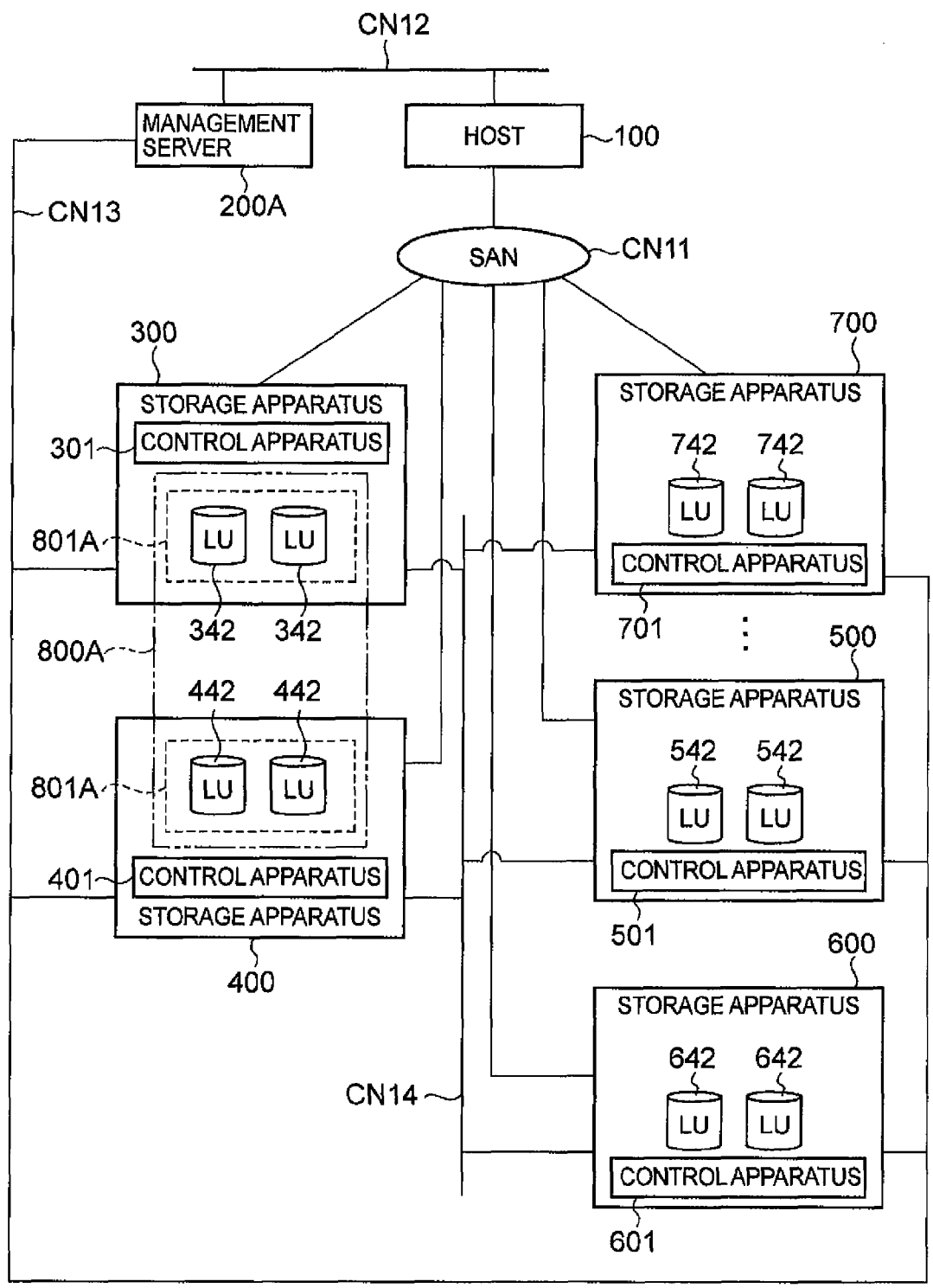
FIG. 22 is a schematic diagram showing the entire constitution of a storage system related to a second embodiment.

FIG. 22 is a schematic diagram showing the overall constitution of a storage system according to this embodiment. This storage system has a plurality of hosts 100 (only one is shown in the figure), a management server 200A, and a plurality of storage apparatuses 300, 400, 500, 600, 700. Furthermore, this embodiment can also comprise other storage apparatuses besides the storages apparatuses 300, 400, 500, 600, 700 shown in the figure.

The points of difference with the first embodiment are the addition of storage apparatuses 600, 700, and the fact that a resource group is defined as spanning a plurality of storage apparatuses 300, 400.

The added storage apparatuses 600, 700, like the other storage apparatuses 400, 500, can basically be constituted the same as storage apparatus 300, and comprise control apparatuses 601, 701. Further, the respective storage apparatuses 600, 700 are connected to the other storage apparatuses 300, 400, 500 via a network for copying CN14. The details of the storage apparatuses 600, 700 will be omitted.

In this embodiment, storage apparatus 300 and storage apparatus 400 constitute migration-source storage apparatuses. That is, a parent resource group 800A is constituted from a resource group 801A provided in a first migration-source storage apparatus 300, and a resource group 801A provided in a second migration-source storage apparatus 400. The respective volumes 342, 442 belonging to this parent resource group 800A constitute migration-source volumes.

Storage apparatuses 500 and 600 constitute migration-destination storage apparatuses. The migration-destination volumes become volume 542 of storage apparatus 500, and volume 642 of storage apparatus 600.

The alternate storage apparatus is storage apparatus 700. The alternate volume becomes volume 742 of storage apparatus 700.

Figure 23:
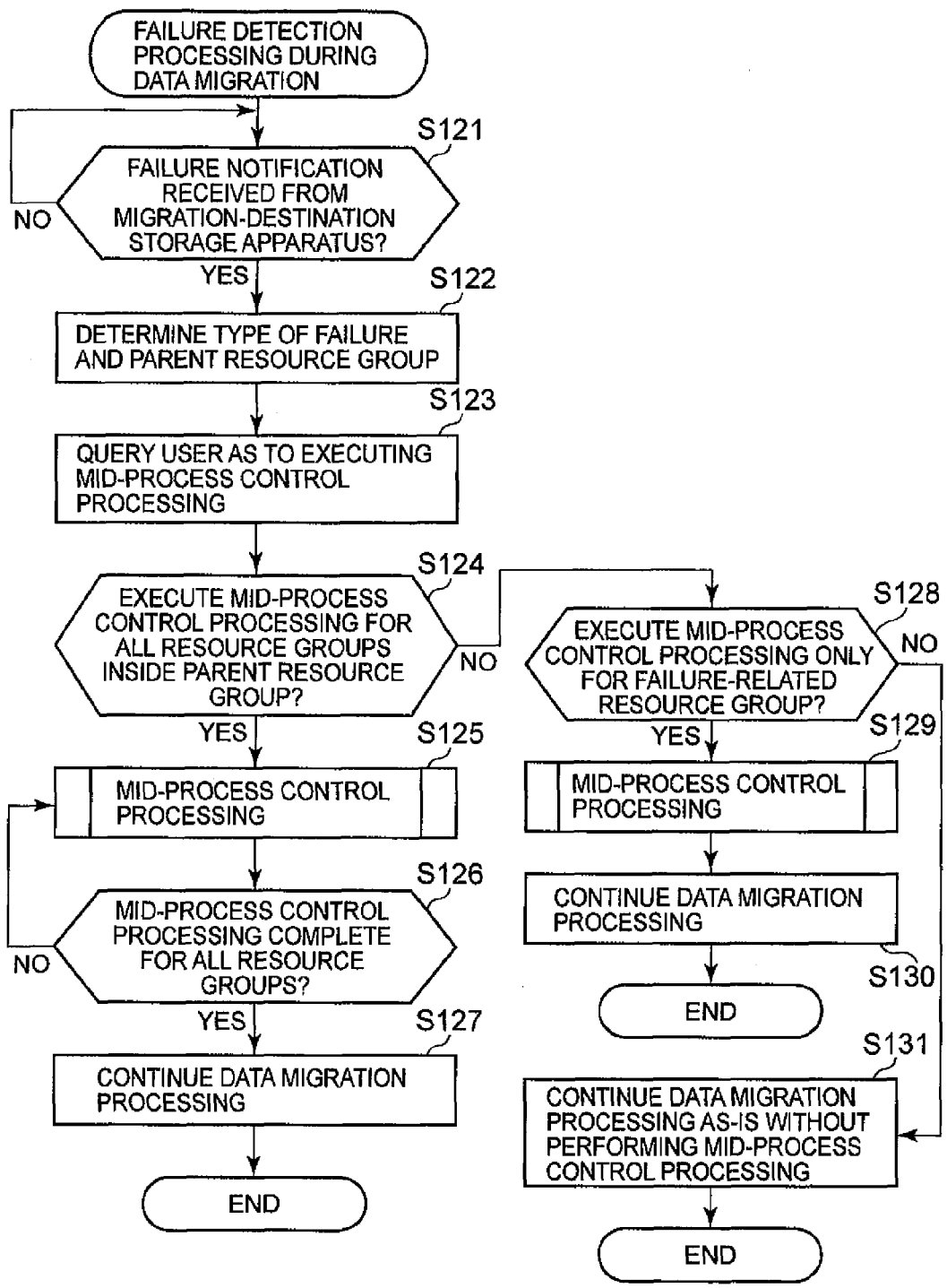
FIG. 23 is a flowchart showing the processing when a failure occurs in the migration-destination storage apparatus during data migration.

FIG. 23 shows the processing procedure when a failure is detected in either of migration-destination storage apparatus 500 or migration-destination storage apparatus 600 during data migration. The CPU 210 of the management server 200A checks for failures in the migration-destination storage apparatuses 500, 600 in accordance with the sequence of the fault monitoring program 223 (S121).

When a failure notification is received from either migration-destination storage apparatus 500 or migration-destination storage apparatus 600 (S121: YES), the management server 200A specifies the type of failure, the parent resource group related to this failure, and the respective resource groups constituting the parent resource group (S122).

Then the management server 200A queries the user as to whether or not to execute the mid-process control process registered in the migration plan table 227 for all resource groups (S123). When the user instructs mid-process control processing (either the canceling or temporary halting of data migration processing, or the changing of the migration destination) for all resource groups regardless of whether or not they are related to the failure of the migration-destination storage apparatuses 500, 600 (S124: YES), the management server 200A executes mid-process control processing for each resource group (S125).

The management server 200A repeatedly executes S125 until the pre-set mid-process control processing is complete for all the resource groups (S126). After mid-process control processing has been executed for all resource groups (S126: YES), the management server 200A continues data migration processing in accordance with the modified migration plan (S127).

By contrast, when the user does not desire uniform mid-process control processing for all resource groups (S124: NO), but rather only wants mid-process control processing for the resource group related to the failure (S128: YES), mid-process control processing is only executed for the pertinent resource group (S129). After mid-process control processing has been completed for the failure-related resource group in the migration-destination storage apparatus, the management server 200A continues data migration processing in accordance with this modified migration plan (mid-process control plan) (S130).

Furthermore, when the user does not desire to execute mid-process control processing (S128: NO), the management server 200A continues the current data migration processing as-is without executing mid-process control processing (S131). That is, in this case, data migration is carried out in accordance with the contents of the initial plan.

This embodiment, which is constituted in this manner, also demonstrates the same effects as the above-mentioned first embodiment. In addition to that, in this embodiment, a plurality of migration-source volumes 342, 442 distributed in a plurality of storage apparatuses 300, 400 can be migrated all at once to a plurality of storage apparatuses 500, 600, thereby further enhancing usability.

Third Embodiment

Figure 24:
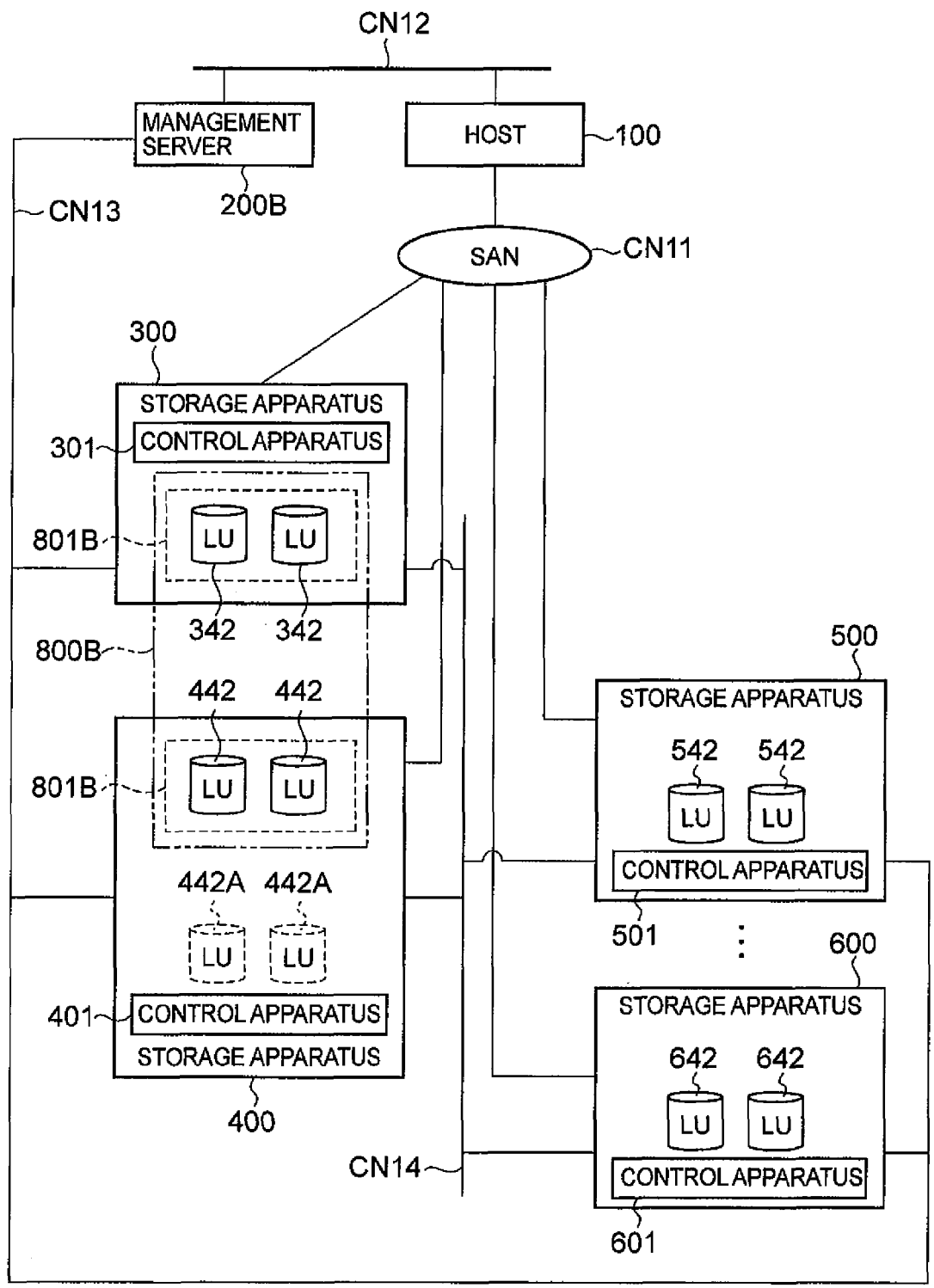
FIG. 24 is a schematic diagram showing the entire constitution of a storage system related to a third embodiment.

A third embodiment of the present invention will be explained based on FIGS. 24 through 26. In this embodiment, forming a local copy 442A of a volume inside the migration-source storage apparatus 400 will appear to a host 100 as if data migration has been completed.

This embodiment comprises a plurality of hosts 100 (only one is shown in the figure), a management server 200B, and a plurality of storage apparatuses 300, 400, 500, 600, 700 the same as the above-mentioned second embodiment. Also similar to the above-mentioned second embodiment, a parent resource group 800B comprising a plurality of resource groups 801B is the target of data migration. The resource group 801B inside storage apparatus 300, and the resource group 801B inside storage apparatus 400 form a remote copy pair. Explanations in common with those of the second embodiment will be omitted so as to focus on the points of difference.

The management server 200B of this embodiment differs from that of the first embodiment, and uses the volume attribute table 228A shown in FIG. 25. The point of difference with the volume attribute table 228 shown in FIG. 10 is that information 2286 for specifying the partner in a copy pair is added. That is, this volume attribute table 228A also manages association information between a plurality of volumes (remote copy pair information 2286).

In this embodiment, the migration-source storage apparatuses are storage apparatus 300 and storage apparatus 400. Further, the migration-destination storage apparatuses are storage apparatus 500 and storage apparatus 600. The alternate storage apparatus is storage apparatus 700.

Figure 26:
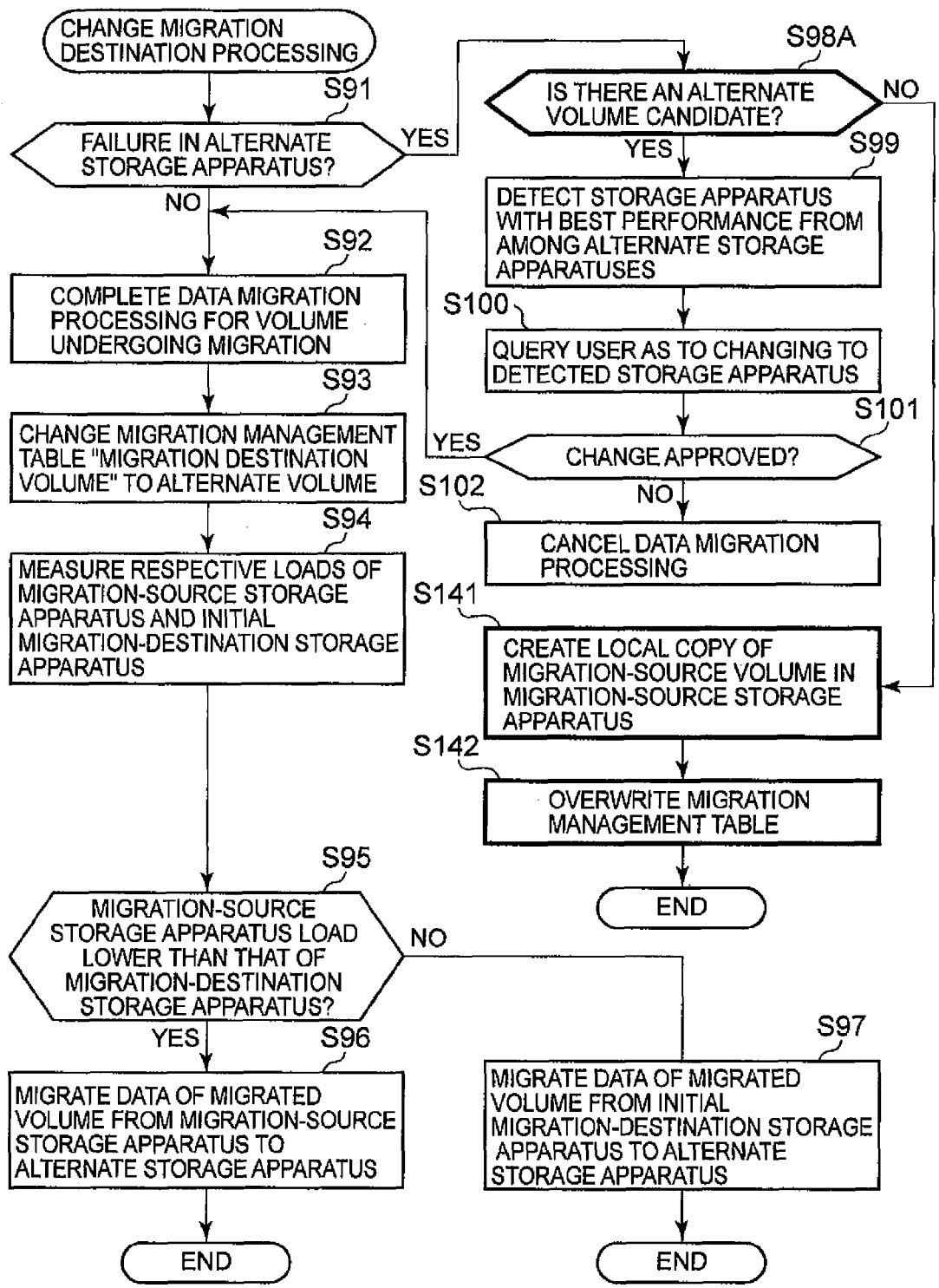
FIG. 26 is a flowchart showing a change-migration-destination process.

FIG. 26 is a flowchart showing a change migration destination process according to this embodiment. This flowchart comprises steps in common to those in the flowchart described together with FIG. 20. Accordingly, if the explanation focuses on the points of difference with FIG. 20, when a failure occurs in either of the alternate storage apparatuses 500, 600 initially set by the user (S91: YES), the management server 200B determines whether or not an alternate volume candidate exists (S98A).

When there is no alternate volume candidate (S98A: NO), the management server 200B generates a copy volume 442A of the migration-source volume 442 inside the migration-source storage apparatus 400 (S141). Then, the management server 200B finished the change of migration destination process by overwriting the migration-destination volume information inside the migration management table 226 to reflect the copy volume 442A.

That is, when a failure occurs in storage apparatus 600 after a plurality of primary volumes 342 forming a remote copy pair have been respectively migrated to a plurality of volumes 542 inside storage apparatus 500, a local copy volume 442A of a secondary volume 442 is generated inside migration-source storage apparatus 400. Then, the copy-pair relationship between the copy volume 442A and the primary volume 542 is re-set, and data migration processing is completed.

Furthermore, for the sake of expediting the explanation, a case in which a copy volume 442A of a secondary volume 442 is generated inside an auxiliary storage apparatus 400 was described, but this embodiment is not limited to this, and a constitution such that a copy volume of a primary volume 342 is provided either inside a main storage apparatus 300, or an auxiliary storage apparatus 400 is also acceptable.

This embodiment, which is constituted in this manner, also demonstrates the same effects as the above-mentioned first and second embodiments. In addition, in this embodiment, the constitution is such that a copy volume 442A, which is a local copy of the migration-source volume 442, is generated inside the migration-source storage apparatus 400, making it appear that data migration has been completed. This makes it possible to complete data migration processing even when an alternate storage apparatus cannot be found, thus enhancing usability.

Fourth Embodiment

Figure 27:
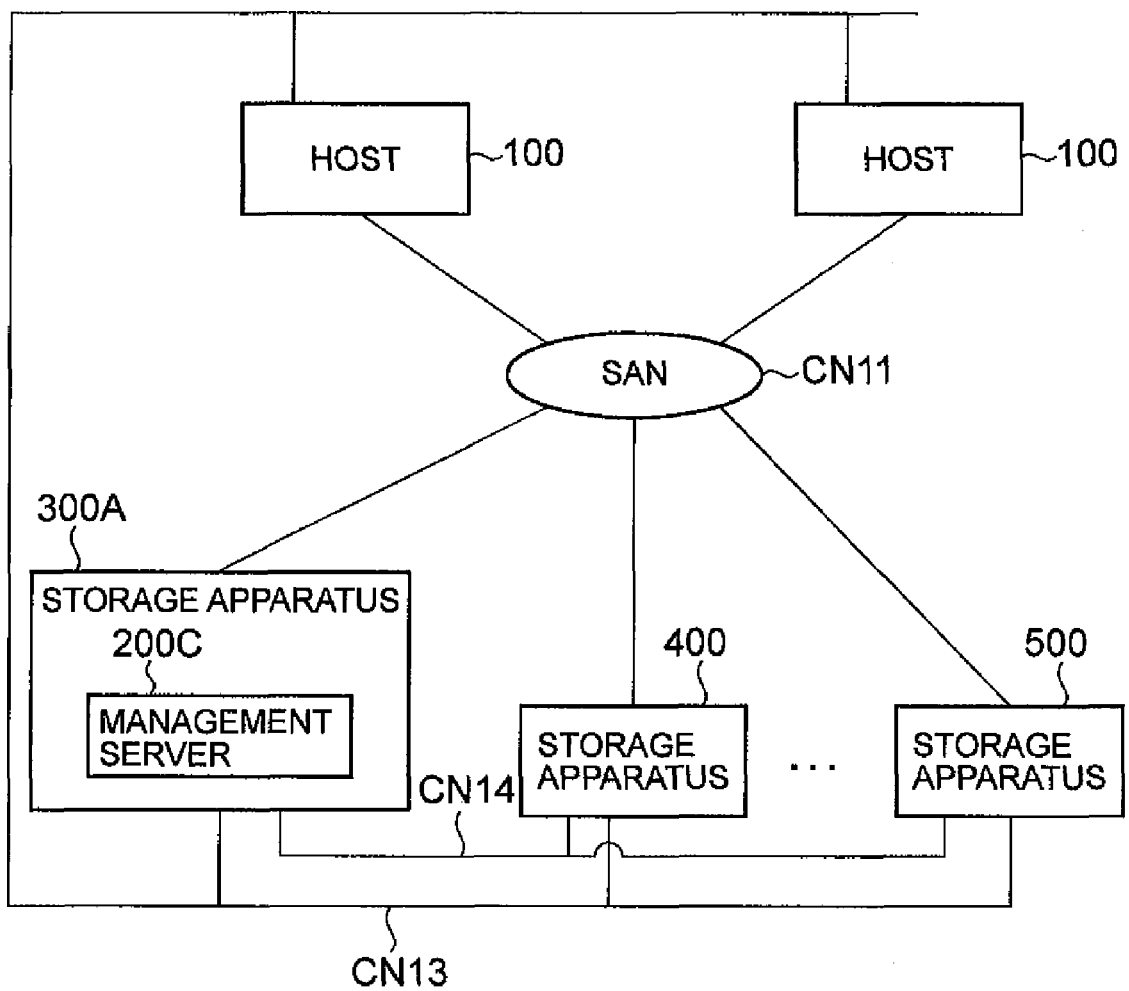
FIG. 27 is a schematic diagram showing the entire constitution of a storage system related to a fourth embodiment.

A fourth embodiment of the present invention will be explained based on FIG. 27. In this embodiment, the functionality of the management server 200C is provided inside storage apparatus 300. FIG. 27 is a schematic diagram showing the overall constitution of a storage system of this embodiment.

The management server 200C is provided inside storage apparatus 300. This management server 200C can manifest the same functionality as the management servers 200, 200A, 200B described hereinabove.

Further, in this embodiment, because the management server 200C is provided inside storage apparatus 300, the storage management network and host management network utilize a common network CN 13. Furthermore, the storage management network and host management network can also be integrated in a constitution in which the management server 200C is not provided inside storage apparatus 300.

Furthermore, instead of a constitution, which disposes the management server 200C in the migration-source storage apparatus 300, the constitution can also be such that the management server 200C is provided either inside the migration-destination storage apparatus 400 or the alternate storage apparatus 500. Or, the constitution can also be such that a management server 200C is provided in each storage apparatus 300, 400, 500, and the management server to be utilized is selected as needed from among these management servers.

This embodiment, which is constituted in this manner, also demonstrates the same effects as the respective embodiments described hereinabove. In addition, in this embodiment, because the management server is embedded inside a storage apparatus, the constitution of the storage system can be simplified. Furthermore, the constitution can also be such that the management server is provided inside a host 100.

Fifth Embodiment

Figure 28:
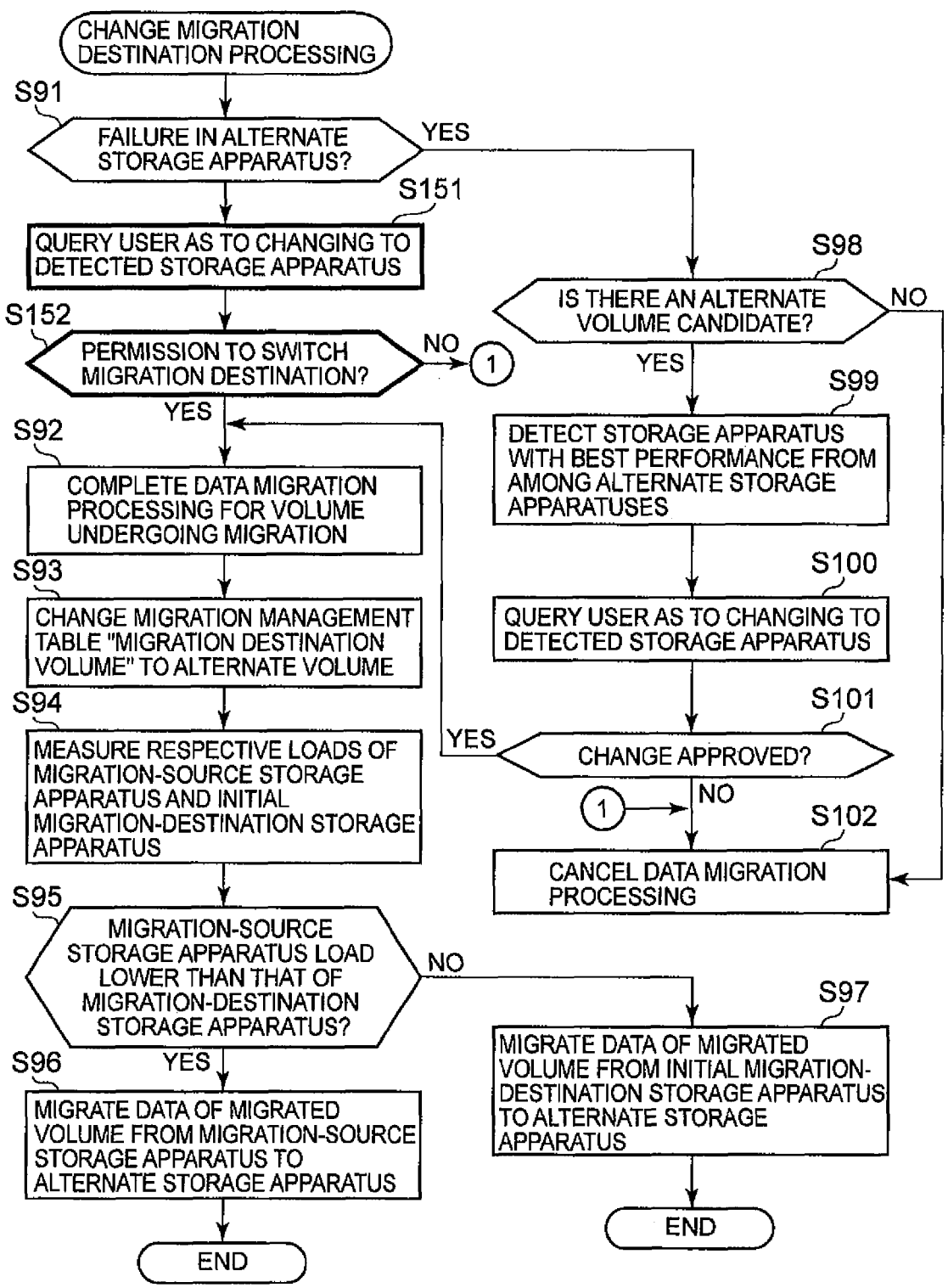
FIG. 28 is a flowchart showing a change-migration-destination process executed by a storage system related to a fifth embodiment.

A fifth embodiment of the present invention will be explained based on FIG. 28. In this embodiment, when switching to an alternate storage apparatus, which a user selected beforehand, the constitution is such that user approval is obtained. FIG. 28 is a flowchart showing the change migration destination process executed by the storage system of this embodiment.

This flowchart comprises steps common to those of the flowchart described together with FIG. 20. Accordingly, if the explanation focuses on the points of difference with FIG. 20, in this embodiment, when there is no failure in the alternate storage apparatus (S91: NO), instead of switching to an alternate storage apparatus right away, the management server queries the user as to the propriety of switching (S151), and waits for approval from the user (S152). When approval from the user is not obtained (S151: NO), data migration processing is canceled (S102).

This embodiment, which is constituted in this manner, also demonstrates the same effects as those of the respective embodiments described hereinabove. In addition, in this embodiment, since the user's intentions are confirmed even when switching to an alternate storage apparatus specified ahead of time by the user, usability is enhanced. It is possible to deal with a situation in which the user's expectations differ from the initial mid-process control plan.

The present invention is not limited to the embodiments described hereinabove. It will be understood by those having skill in the art that various additions and changes can be made without departing from the scope of the present invention. For example, a person skilled in the art will be able to combine the respective embodiments as needed.

In this embodiment, the constitution is such that the approval of the user is requested when selecting one alternate storage apparatus from any of the alternate storage apparatus candidates, or when switching from the migration-destination storage apparatus to an alternate storage apparatus, but the constitution can also be such that the management server automatically carries out switching instead.

What is claimed is:

1. A computer system comprising:
a storage system including a plurality of storage apparatuses, each providing volumes;
a host computer accessing the storage system via a network; and
a management computer monitoring the plurality of storage apparatuses,
wherein the management computer manages a resource group associated with migration source volumes,
wherein the management computer stores migration management information which includes migration statuses of the migration source volumes to migration destination volumes, and identifiers of alternate migration destination volumes corresponding to the migration source volumes, and
wherein, during migration of the migration source volumes to the migration destination volumes, the management computer:
detects a certain status of the storage apparatuses according to the monitoring of the plurality of the storage apparatuses;
queries a user to change migration destinations of the migration source volumes, from the migration destination volume to the alternate migration destination volumes; and
changes migration destinations of the migration source volumes, from the migration destination volumes to the alternate migration destination volumes, if the management computer receives instruction of change execution, wherein the management computer receives a time period, selects the alternate migration destination volumes, based on loads of the volumes within the time period, wherein the selection of the alternate migration destination volumes is executed before the migration of the migration source volumes to the migration destination volumes, wherein the management computer displays candidates of the alternate migration destination volumes in sequence of low load within the time period, for the selection of the alternate migration destination volumes, wherein the plurality of storage apparatuses includes a parity group used by the volumes, and wherein the certain status of the storage system is an increased load of the parity group.

2. A computer system according to claim 1, wherein the certain status of the storage system is an increased load of the network, and an increased load of volume.

3. A computer system according to claim 2, wherein the change migration destination plans indicate a condition of a migration process for executing the nature of the control process.

4. A management computer managing a storage system including a plurality of storage apparatuses, each providing volumes, the management computer comprising:

a memory storing resource group information about a resource group associated with migration source volumes, and migration management information which includes migration statuses of the migration source volumes to migration destination volumes, and identifiers of alternate migration destination volumes corresponding to the migration source volumes; and a CPU configured to during migration of the migration source volumes to the migration destination volumes:

detect a certain status of the storage apparatuses according to the monitoring of the plurality of the storage apparatuses;

query a user to change migration destinations of the migration source volumes, from the migration destination volume to the alternate migration destination volumes; and change migration destinations of the migration source volumes, from the migration destination volumes to the alternate migration destination volumes, if the management computer receives instruction of change execution, wherein the CPU receives a time period, and selects the alternate migration destination volumes, based on loads of the volumes within the time period, wherein the selection of the alternate migration destination volumes is executed before the migration of the migration source volumes to the migration destination volumes, wherein the CPU displays candidates of the alternate migration destination volumes in sequence of low load within the time period, for the selection of the alternate migration destination volumes, wherein the plurality of storage apparatuses includes a parity group used by the volumes, and wherein the certain status of the storage system is an increased load of the parity group.

5. A management computer according to claim 4, wherein the certain status of the storage system is an increased load of the network, and an increased load of volume.

6. A management computer according to claim 4, wherein the change migration destination plans indicate a condition of a migration process for executing the nature of the control process.

7. A computer program product stored in a computer readable medium for a management computer managing a storage system including a plurality of storage apparatuses, each providing volumes, the computer program product comprising:

a code causing the management computer to store resource group information about a resource group associated with migration source volumes, and migration management information which includes migration statuses of the migration source volumes to migration destination volumes, and identifiers of alternate migration destination volumes corresponding to the migration source volumes; and a code causing the management computer to, during migration of the migration source volumes to the migration destination volumes:

detect a certain status of the storage apparatuses according to the monitoring of the plurality of the storage apparatuses;

query a user to change migration destinations of the migration source volumes, from the migration destination volume to the alternate migration destination volumes; and change migration destinations of the migration source volumes, from the migration destination volumes to the alternate migration destination volumes, if the management computer receives instruction of change execution, and wherein the computer program product causes the management computer to receive a time period, and select the alternate migration destination volumes, based on loads of the volumes within the time period, wherein the selection of the alternate migration destination volumes is executed before the migration of the migration source volumes to the migration destination volumes, wherein the computer program product causes the management computer to display candidates of the alternate migration destination volumes in sequence of low load within the time period, for the selection of the alternate migration destination volumes, wherein the plurality of storage apparatuses includes a parity group used by the volumes, and wherein the certain status of the storage system is an increased load of the parity group.

8. A computer program product according to claim 7, wherein the certain status of the storage system is an increased load of the network, and an increased load of volume.

9. A computer program product according to claim 7, wherein the change migration destination plans indicate a condition of a migration process for executing the nature of the control process.

* * * * *